US012563158B2

(12) United States Patent
Veselinovic et al.

(10) Patent No.: US 12,563,158 B2
(45) Date of Patent: Feb. 24, 2026

(54) CONFERENCING SYSTEMS AND METHODS FOR TALKER TRACKING AND CAMERA POSITIONING

(71) Applicant: Shure Acquisition Holdings, Inc., Niles, IL (US)

(72) Inventors: Dusan Veselinovic, Chicago, IL (US); Bijal Joshi, Elk Grove Village, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 227 days.

(21) Appl. No.: 18/345,640

(22) Filed: Jun. 30, 2023

(65) Prior Publication Data

US 2024/0007592 A1      Jan. 4, 2024

Related U.S. Application Data

(60) Provisional application No. 63/367,438, filed on Jun. 30, 2022.

(51) Int. Cl.
 *H04N 7/15*      (2006.01)
 *G06T 7/20*      (2017.01)
  (Continued)

(52) U.S. Cl.
 CPC ............... *H04N 7/152* (2013.01); *G06T 7/20* (2013.01); *G06T 7/70* (2017.01); *H04N 7/147* (2013.01);
  (Continued)

(58) Field of Classification Search
 CPC ...... H04N 7/152; H04N 7/147; H04N 23/611; H04N 23/69; H04N 23/695; H04N 7/14;
  (Continued)

(56) References Cited

U.S. PATENT DOCUMENTS

| | | | |
|---|---|---|---|
| 5,206,721 A | 4/1993 | Ashida | |
| 5,686,957 A | 11/1997 | Baker | |
| | (Continued) | | |

FOREIGN PATENT DOCUMENTS

| | | | |
|---|---|---|---|
| CN | 102843540 | 12/2012 | |
| CN | 107809596 | 3/2018 | |
| | (Continued) | | |

OTHER PUBLICATIONS

Aarabi, "The Fusion of Distributed Microphone Arrays for Sound Localization," Eurasip Journal on Applied Signal Processing, vol. 2003, No. 4, Jan. 2003, 10 pp.
(Continued)

*Primary Examiner* — Yosef K Laekemariam
(74) *Attorney, Agent, or Firm* — Alston & Bird LLP

(57) ABSTRACT

Conferencing systems and methods configured to generate talker coordinates for directing a camera towards talker locations in an environment are disclosed, as well as talker tracking using multiple microphones and multiple cameras. One method includes determining, using a first microphone array and based on audio associated with a talker, a first talker location in a first coordinate system relative to the first microphone array; determining, using a second microphone array and based on the audio associated with the talker, a second talker location in a second coordinate system relative to the second microphone array; determining, based on the first talker location and the second talker location, an estimated talker location in a third coordinate system relative to a camera; and transmitting, to the camera, the estimated talker location in the third coordinate system to cause the camera to point the camera towards the estimated talker location.

20 Claims, 7 Drawing Sheets

(51) Int. Cl.

| | |
|---|---|
| *G06T 7/70* | (2017.01) |
| *H04N 7/14* | (2006.01) |
| *H04N 23/611* | (2023.01) |
| *H04N 23/69* | (2023.01) |
| *H04N 23/695* | (2023.01) |

(52) U.S. Cl.
CPC ........... *H04N 23/611* (2023.01); *H04N 23/69* (2023.01); *H04N 23/695* (2023.01)

(58) Field of Classification Search
CPC .... H04N 7/15; G06T 7/20; G06T 7/70; H04R 27/00; H04R 3/005
See application file for complete search history.

(56) References Cited

U.S. PATENT DOCUMENTS

| | | | |
|---|---|---|---|
| 6,731,334 B1 | 5/2004 | Maeng | |
| 6,980,485 B2 | 12/2005 | McCaskill | |
| 7,305,095 B2 | 12/2007 | Rui | |
| 7,349,008 B2 | 3/2008 | Rui | |
| 7,403,217 B2 | 7/2008 | Schulz | |
| 7,487,056 B2 | 2/2009 | Tashev | |
| 7,586,513 B2 | 9/2009 | Muren | |
| 7,852,369 B2 | 12/2010 | Cutler | |
| 8,189,807 B2 | 5/2012 | Cutler | |
| 8,238,573 B2 | 8/2012 | Ishibashi | |
| 8,248,448 B2 | 8/2012 | Feng | |
| 9,030,520 B2 | 5/2015 | Chu | |
| 9,179,098 B2 | 11/2015 | Buckler | |
| 9,338,549 B2 | 5/2016 | Haulick | |
| 9,350,940 B1 | 5/2016 | Baker | |
| 9,392,221 B2 | 7/2016 | Feng | |
| 9,489,948 B1 | 11/2016 | Chu | |
| 9,621,795 B1 * | 4/2017 | Whyte | H04R 1/406 |
| 9,633,270 B1 | 4/2017 | Tangeland | |
| 9,674,453 B1 | 6/2017 | Tangeland | |
| 9,769,424 B2 | 9/2017 | Michot | |
| 9,769,552 B2 | 9/2017 | Choisel | |
| 9,980,040 B2 | 5/2018 | Whyte | |
| 10,091,412 B1 | 10/2018 | Feng | |
| 10,491,809 B2 | 11/2019 | Feng | |
| 10,582,117 B1 | 3/2020 | Tanaka | |
| 10,966,022 B1 | 3/2021 | Chu | |
| 11,127,401 B2 | 9/2021 | Sarkar | |
| 11,381,906 B2 | 7/2022 | Rollow, IV | |
| 11,438,691 B2 | 9/2022 | Veselinovic | |
| 11,601,731 B1 | 3/2023 | Slotznick | |
| 11,695,900 B2 | 7/2023 | Childress, Jr. | |
| 11,902,656 B2 | 2/2024 | Muthiah | |
| 12,143,806 B2 | 11/2024 | Mcelveen | |
| 2005/0008169 A1 | 1/2005 | Muren | |
| 2005/0140779 A1 | 6/2005 | Schulz | |
| 2005/0283328 A1 | 12/2005 | Tashev | |
| 2006/0005136 A1 | 1/2006 | Wallick | |
| 2006/0262942 A1 | 11/2006 | Oxford | |
| 2008/0037802 A1 | 2/2008 | Posa | |
| 2009/0323981 A1 | 12/2009 | Cutler | |
| 2011/0135125 A1 | 6/2011 | Zhan | |
| 2011/0285809 A1 | 11/2011 | Feng | |
| 2011/0317522 A1 | 12/2011 | Florencio | |
| 2012/0294118 A1 | 11/2012 | Haulick | |
| 2013/0271559 A1 | 10/2013 | Feng | |
| 2013/0300820 A1 | 11/2013 | Liu | |
| 2014/0362163 A1 | 12/2014 | Winterstein | |
| 2015/0146078 A1 | 5/2015 | Aarrestad | |
| 2015/0156578 A1 | 6/2015 | Alexandridis | |
| 2016/0277712 A1 | 9/2016 | Michot | |
| 2017/0201825 A1 | 7/2017 | Whyte | |
| 2018/0167581 A1 | 6/2018 | Goesnar | |
| 2018/0270451 A1 | 9/2018 | Dickins | |
| 2019/0158733 A1 | 5/2019 | Feng | |
| 2020/0084366 A1 | 3/2020 | Fujiwara | |
| 2020/0322719 A1 | 10/2020 | Mccowan | |
| 2020/0351435 A1 | 11/2020 | Therkelsen | |

| | | | |
|---|---|---|---|
| 2021/0051397 A1 | 2/2021 | Veselinovic | |
| 2021/0097995 A1 | 4/2021 | Sarkar | |
| 2021/0152930 A1 | 5/2021 | Bryans | |
| 2021/0266680 A1 | 8/2021 | Frieding | |
| 2021/0345040 A1 | 11/2021 | Meyer | |
| 2021/0360193 A1 | 11/2021 | Childress, Jr. | |
| 2022/0201421 A1 | 6/2022 | Mcelveen | |
| 2022/0353465 A1 | 11/2022 | Smith | |
| 2023/0025997 A1 | 1/2023 | Liu | |
| 2023/0053202 A1 | 2/2023 | Chu | |
| 2023/0086490 A1 | 3/2023 | Abraham | |
| 2023/0216988 A1 * | 7/2023 | Yan | H04N 7/15 348/14.08 |
| 2024/0007744 A1 | 1/2024 | Muthiah | |

FOREIGN PATENT DOCUMENTS

| | | |
|---|---|---|
| CN | 108063910 | 5/2018 |
| CN | 108370470 | 8/2018 |
| CN | 112311999 | 2/2021 |
| CN | 112689092 | 4/2021 |
| CN | 113099160 | 7/2021 |
| EP | 0765084 | 3/1997 |
| EP | 1705911 | 9/2006 |
| JP | H01180193 | 7/1989 |
| JP | H0314386 | 1/1991 |
| JP | H1042264 | 2/1998 |
| JP | 2000041228 | 2/2000 |
| JP | 3739673 | 1/2006 |
| JP | 2011193392 | 9/2011 |
| JP | 2020043456 | 3/2020 |
| KR | 101884446 | 8/2018 |
| KR | 102407872 | 6/2022 |
| WO | 2008047804 | 4/2008 |

OTHER PUBLICATIONS

Gabriel, et al., "Design and assessment of multiple-sound source localization using microphone arrays," Proceedings of the 2019 IEEE/SICE Intl. Symposium on System Integration, Jan. 2019, 6 pp.

International Search Report and Written Opinion for PCT/US2023/026753 dated Sep. 15, 2023, 13 pp.

Ishi, et al., "Speech activity detection and face orientation estimation using multiple microphone arrays and human position information," IEEE/RSJ Intl. Conference on Intelligent Robots and Systems, 2015, 6 pp.

Ronzhin, et al., "Audiovisual Speaker Localization in Medium Smart Meeting Room," IEEE ICICS 8th International Conference, Dec. 2011, 5 pp.

Sharma, "The Ultimate Guide to K-Means Clustering: Definition, Methods and Applications," Analytics Vidhya, Nov. 3, 2023, 19 pp.

International Search Report and Written Opinion for PCT/US2023/030647 dated Nov. 9, 2023, 11 pp.

Lathoud, et al., "Short-Term Spatio-Temporal Clustering Applied to Multiple Moving Speakers," IEEE Transactions on Audio, Speech, and Language Processing, vol. 15, No. 5, Jul. 2007, 15 pp.

Thiergart, et al., "Localization of Sound Sources in Reverberant Environments Based on Directional Audio Coding Parameters," Audio Engineering Society Convention 127, New York, Oct. 2009, 14 pp.

Nishiura, et al., "Collaborative Steering of Microphone Array and Video Camera Toward Multi-lingual Tele-conference Through Speech-to-Speech Translation," IEEE Workshop on Automatic Speech Recognition and Understanding, 2001, 4 pp.

Legg, et al., "A Combined Microphone and Camera Calibration Technique with Application to Acoustic Imaging," IEEE Transactions on Image Processing, vol. 22, No. 10, pp. 4028-4039, Oct. 1, 2013, 12 pp.

International Search Report and Written Opinion for PCT/US2022/076815 dated Jan. 5, 2023, 12 pp.

Wang, et al., "Voice Source Localization for Automatic Camera Pointing System in Videoconferencing," 1997 IEEE International Conference on Acoustics, Speech, and Signal Processing, vol. 1, 4 pp.

(56)  References Cited

OTHER PUBLICATIONS

DiBiase, et al., "Robust Localization in Reverberant Rooms," Microphone Arrays, 2001, 24 pp.

Ishi, et al., "Using multiple microphone arrays and reflections for 3D localization of sound sources," 2013 IEEE/RSJ International Conference on Intelligent Robots and Systems, 6 pp.

ATND1061DAN, Beamforming Array Microphone, User Manual, Audio-technica, 2022, 107 pp.

AVer Press Release, "AVer Partners with Sennheiser to Transform Video and Audio Collaboration," Nov. 18, 2021, 1 p.

AVer PTZ Link, User Manual, AVer Information Inc., 2022, 71 pp.

Dong, et al., "Research on TDOA based microphone array acoustic localization," IEEE 12th International Conference on Electronic Measurement & Instruments, 2015, 5 pp.

HDL300 System, Nureva Product Page, Downloaded from webpage <https://www.nureva.com/audio-conferencing/hdl300> on Dec. 4, 2024, 10 pp.

International Search Report and Written Opinion for PCT/US2024/036908 dated Nov. 13, 2024, 14 pp.

Introducing StreamSet, Audio-technica, Product Page, Downloaded from webpage <https://www.audio-technica.com/en-us/> on May 15, 2023, 7 pp.

Kuhn, "Adaptive Audio/Video Zone Creation in Online Meeting Environment," ip.com, Jun. 22, 2022, 5 pp.

Mitchell, "Poly Studio review: Take the pain out of videoconferencing," ITPro, Sep. 17, 2019, 9 pp.

MXA920 Command Strings, Shure, User Manual, 2024, 41 pp.

Vissonic Audio Solutions, Array Microphone Conference Solution, Downloaded from <https://www.vissonic.com/solution/220.html> on Dec. 4, 2024, 7 pp.

Webex Help Center, "Differences between the presenter and the audience, briefing room, and classroom setups," Downloaded from website <https://help.webex.com/en-us/article/n4522teb/Set-up-classroom-on-Room-Series> on Feb. 11, 2025, 15 pp.

Yealink, MeetingEye 800, 4K UHD Video Conferencing Endpoint, Information Sheet, 2022, 4 pp.

* cited by examiner

Determine a first talker location using a first microphone — 402

Determine a second talker location using a second microphone — 404

Determine an estimated talker location based on the first and second talker locations — 406

Transmit the estimated talker location to a camera — 408

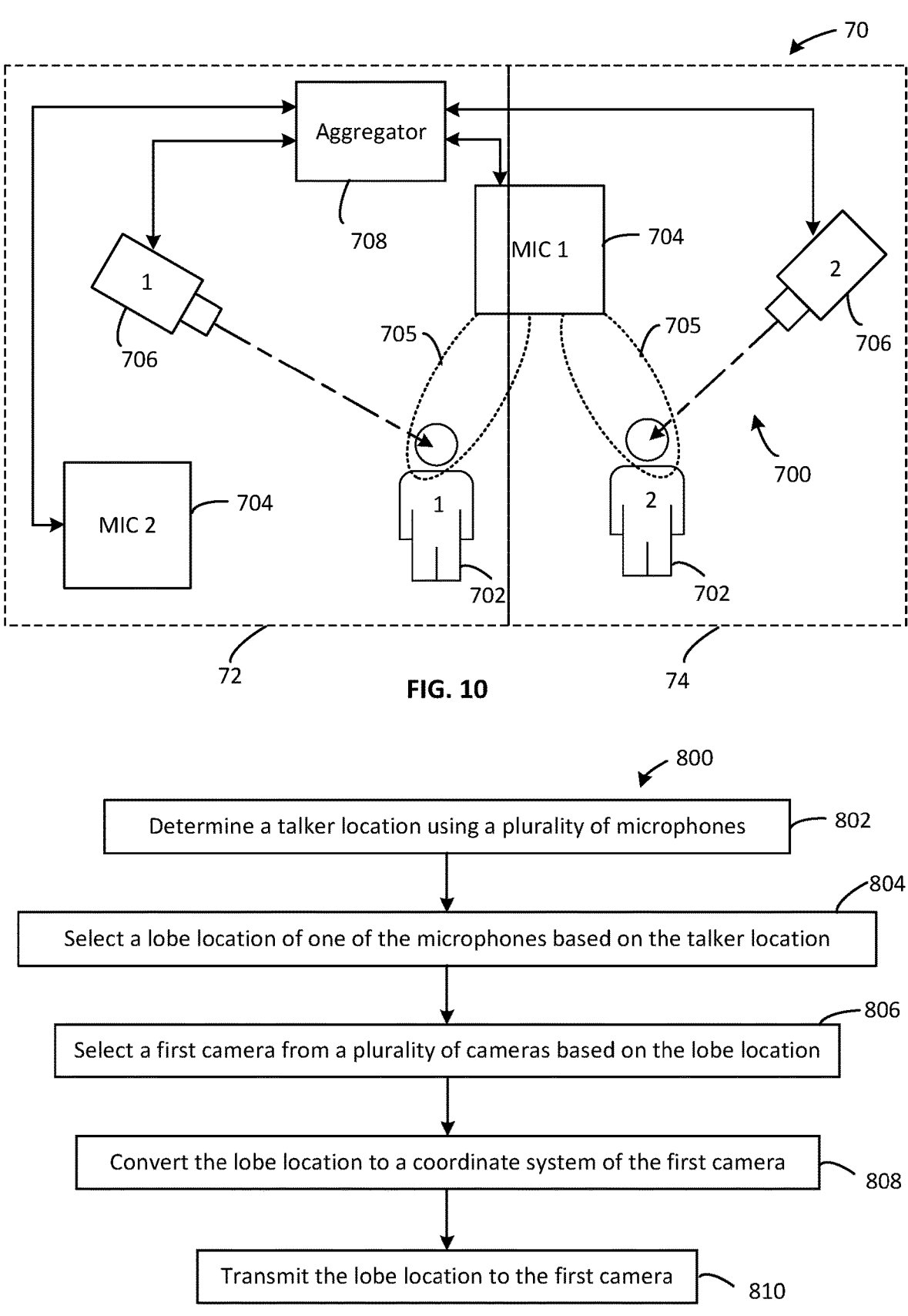

FIG. 10

```
              ┌──────────────────────────────────────────────┐
              │  Determine a talker location using a          │──── 802
              │  plurality of microphones                     │
              └──────────────────────────────────────────────┘
                                  │
                                  ▼                             ── 804
        ┌──────────────────────────────────────────────────────┐
        │  Select a lobe location of one of the microphones     │
        │  based on the talker location                         │
        └──────────────────────────────────────────────────────┘
                                  │
                                  ▼                             ── 806
        ┌──────────────────────────────────────────────────────┐
        │  Select a first camera from a plurality of cameras    │
        │  based on the lobe location                           │
        └──────────────────────────────────────────────────────┘
                                  │
                                  ▼
        ┌──────────────────────────────────────────────────────┐
        │  Convert the lobe location to a coordinate system     │
        │  of the first camera                                  │──── 808
        └──────────────────────────────────────────────────────┘
                                  │
                                  ▼
              ┌──────────────────────────────────────────────┐
              │  Transmit the lobe location to the first       │
              │  camera                                        │──── 810
              └──────────────────────────────────────────────┘
```

FIG. 11

CONFERENCING SYSTEMS AND METHODS FOR TALKER TRACKING AND CAMERA POSITIONING

CROSS-REFERENCE

This application claims priority to U.S. Provisional Patent Application No. 63/367,438, filed on Jun. 30, 2022, the contents of which are incorporated herein by reference in their entirety.

TECHNICAL FIELD

This disclosure generally relates to talker tracking and camera positioning in a conferencing environment, and more specifically, to conferencing systems and methods for positioning a camera towards a talker location determined using one or more microphones and/or one or more cameras.

BACKGROUND

Conferencing environments, such as conference rooms, boardrooms, video conferencing settings, and the like, typically involve the use of microphones (including microphone arrays) for capturing sound from various audio sources in the environment (also known as a "near end") and loudspeakers for presenting audio from a remote location (also known as a "far end"). For example, persons in a conference room may be conducting a conference call with persons at a remote location. Typically, speech and sound from the conference room may be captured by microphones and transmitted to the remote location, while speech and sound from the remote location may be received and played on loudspeakers in the conference room. Multiple microphones may be used in order to optimally capture the speech and sound in the conference room.

Such conferencing environments may also include one or more image capture devices, such as cameras, which can be used to capture and provide images and video of persons and objects in the environment to be transmitted for viewing at the remote location. However, it may be difficult for the viewers at the remote location to see particular talkers, for example, if the camera is configured to show the entire room, or if the camera is fixed on a specific, pre-configured portion of the room and the talkers move in and out of that portion during the meeting or event. Talkers may include, for example, humans in the environment that are speaking or making other sounds.

In addition, in environments where multiple cameras and/or multiple microphones (or microphone arrays) are desirable for adequate video and audio coverage, it may be difficult to accurately identify a unique talker in the environment and/or identify which of the cameras and/or microphones should be directed towards the talker. Moreover, in some environments with multiple cameras and/or multiple microphones, the relative positions of the cameras and microphone may not be known or pre-defined. In such environments, it may be difficult to accurately correlate camera angles with talker positions. While a professional installer or integrator may manually configure zones or presets for cameras based on location information from a microphone array, this is often a time-consuming, laborious, and inflexible process. For example, if a seating arrangement in a room is changed after an initial setup of the conferencing system, pre-configured camera zones may not adequately cover the participants, and such zones may be difficult to modify after they are set up, and/or may only be modified by a professional installer or integrator.

SUMMARY

The techniques of this disclosure provide systems and methods designed to, among other things: (1) determine coordinates for positioning a camera towards a talker based on a talker location identified by using two or more microphones (or microphone arrays); (2) adjust a lobe location or other audio pick-up coverage area of a microphone based on a talker location identified by using a camera; and (3) select a camera from a plurality of cameras for positioning towards a talker based on a location of a microphone lobe or other audio beam directed towards the talker, the lobe location selected based on a talker location identified by using two or more microphones.

In an embodiment, a method, performed by one or more processors in communication with each of a first microphone, a second microphone, and a camera, comprises: determining, using a first microphone array and based on audio associated with a talker, a first talker location in a first coordinate system that is relative to the first microphone array; determining, using a second microphone array and based on the audio associated with the talker, a second talker location in a second coordinate system that is relative to the second microphone array; determining, using at least one processor and based on the first talker location and the second talker location, an estimated talker location in a third coordinate system that is relative to a camera; and transmitting, to the camera, the estimated talker location in the third coordinate system to cause the camera to point an image capturing component of the camera towards the estimated talker location.

In another embodiment, a system comprises a first microphone array configured to determine, based on audio associated with a talker, a first talker location in a first coordinate system that is relative to the first microphone array; a second microphone array configured to determine, based on the audio associated with the talker, a second talker location in a second coordinate system that is relative to the second microphone array; a camera comprising an image capturing component; and one or more processors communicatively coupled to each of the first microphone array, the second microphone array, and the camera, the one or more processors configured to determine, based on the first talker location and the second talker location, an estimated talker location in a third coordinate system that is relative to the camera, and transmit, to the camera, the estimated talker location in the third coordinate system, wherein the camera is configured to point the image capturing component towards the estimated talker location received from the one or more processor.

In a further embodiment, a non-transitory computer-readable storage medium comprises instructions that, when executed by one or more processors in communication with each of a first microphone array, a second microphone array, and a camera, cause the one or more processors to perform: determining, using the first microphone array and based on audio associated with a talker, a first talker location in a first coordinate system that is relative to the first microphone array; determining, using the second microphone array and based on the audio associated with the talker, a second talker location in a second coordinate system that is relative to the second microphone array; determining, based on the first talker location and the second talker location, an estimated talker location in a third coordinate system that is relative to a camera; and transmitting, to the camera, the estimated talker location in the third coordinate system to cause the camera to point an image capturing component of the camera towards the estimated talker location.

In another embodiment, a method, performed by one or more processors in communication with each of a first microphone, a second microphone, and a camera, comprises: determining, using a microphone array and based on audio associated with a talker, a first talker location of the microphone array in a first coordinate system that is relative to the first microphone array; converting, using at least one processor, the first talker location from the first coordinate system to a second coordinate system that is relative to a camera; transmitting, to the camera, the first talker location in the second coordinate system to cause the camera to point an image capturing component of the camera towards the first talker location; receiving, from the camera, a second talker location in the second coordinate system that is identified by the camera using a talker detection component of the camera; and adjusting, using the microphone array, a lobe location of the microphone array based on the second talker location received from the camera.

According to some aspects, adjusting the lobe location comprises adjusting a distance coordinate of the lobe location in the second coordinate system based on a distance coordinate of the second talker location in the second coordinate system; and converting the adjusted lobe location from the second coordinate system to the first coordinate system.

According to some aspects, adjusting the lobe location comprises converting the second talker location from the second coordinate system to the first coordinate system; and adjusting, using the at least one processor, a distance coordinate of the lobe location in the first coordinate system based on a distance coordinate of the second talker location in the first coordinate system.

According to some aspects, determining the first talker location comprises determining a location of a sound generated near the microphone array using an audio localization algorithm executed by an audio activity localizer.

In a further embodiment, a method, performed by one or more processors in communication with each of a plurality of microphone arrays and a plurality of cameras, comprises: determining, using the plurality of microphone arrays and based on audio associated with a talker, a talker location in a first coordinate system that is relative to a first microphone array of the plurality of microphone arrays; selecting, based on the talker location in the first coordinate system, a lobe location of a select one of the plurality of microphone arrays in the first coordinate system; selecting, based on the lobe location, a first camera of the plurality of cameras; converting the lobe location to a second coordinate system that is relative to the first camera; and transmitting, to the first camera, the lobe location in the second coordinate system to cause the first camera to point an image capturing component of the first camera towards the lobe location.

According to some aspects, selecting the lobe location comprises: determining a distance between the talker location and each of the plurality of microphone arrays in the first coordinate system; and identifying the select one of the plurality of microphone arrays as being closest to the talker location in the first coordinate system.

According to some aspects, selecting the first camera comprises: converting the lobe location from the first coordinate system to a common coordinate system; identifying a first region of a plurality of regions in the common coordinate system as including the lobe location in the common coordinate system, each region being assigned to one or more of the plurality of cameras; and identifying the first camera as being assigned to the first region.

According to some aspects, determining the talker location comprises determining a location of a sound generated near the plurality of microphone arrays using an audio localization algorithm executed by an audio activity localizer.

These and other embodiments, and various permutations and aspects, will become apparent and be more fully understood from the following detailed description and accompanying drawings, which set forth illustrative embodiments that are indicative of the various ways in which the principles of the invention may be employed.

BRIEF DESCRIPTION OF THE DRAWINGS

FIGS. 8 through 10 are schematic diagrams of an exemplary environment comprising a conferencing system that can be utilized to determine camera positioning for one or more talkers based on lobe location(s) selected based on talker coordinates obtained by one or more microphones, in accordance with one or more embodiments.

FIG. 11 is a flowchart illustrating operations for determining camera positioning in an environment based on a lobe location that is selected according to talker coordinates obtained by one or more microphones, in accordance with one or more embodiments.

DETAILED DESCRIPTION

Figures 1, 2:
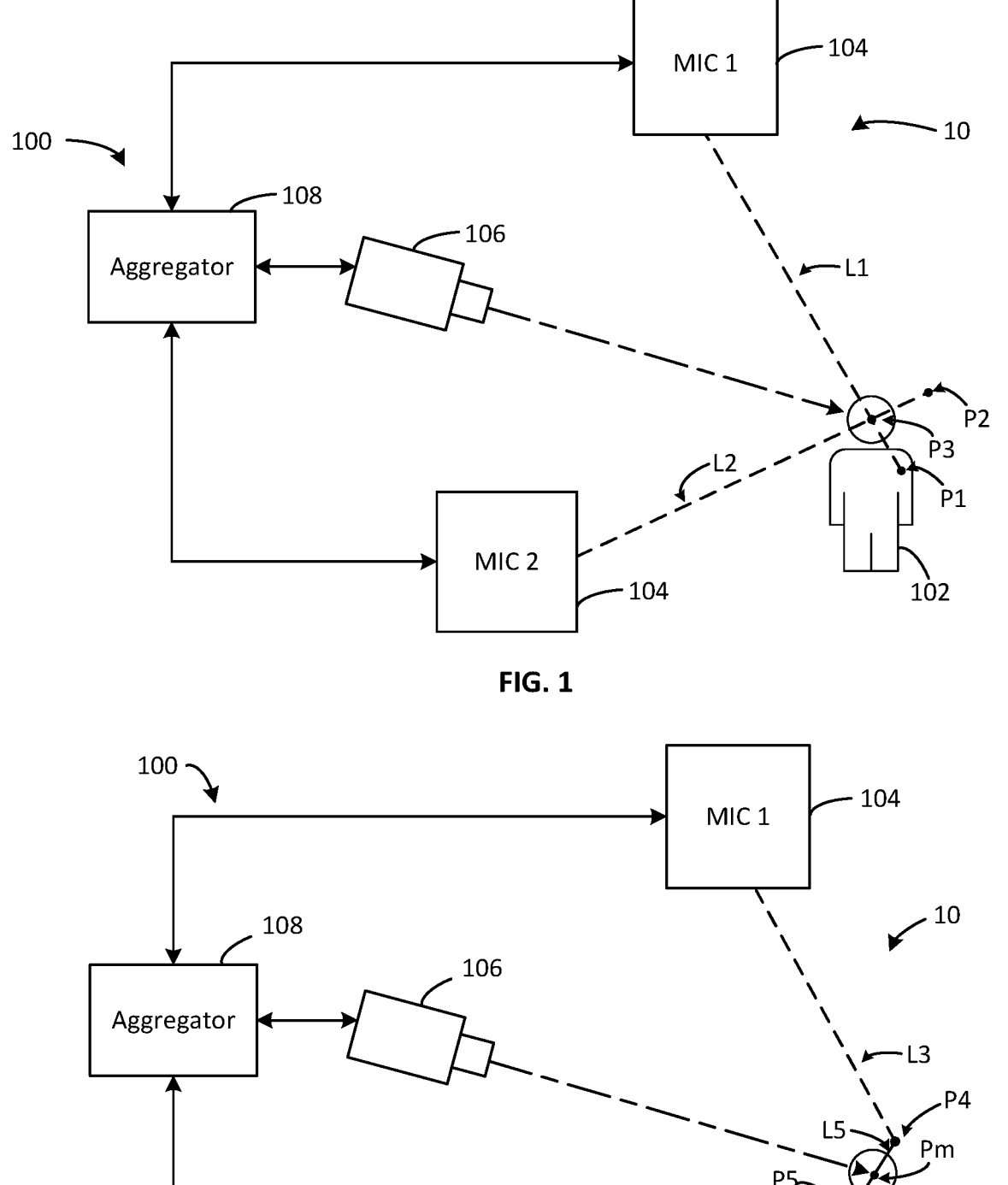
FIGS. 1 and 2 are schematic diagrams of an exemplary environment comprising a conferencing system that can be utilized to determine a location of a talker using talker coordinates obtained by a plurality of microphones, in accordance with one or more embodiments.

The systems and methods described herein can improve the configuration and usage of conferencing systems by using audio localization information gathered by multiple microphones (or microphone arrays) to position a camera towards an active talker or other audio source in an environment. For example, each microphone can detect a location of a talker in the environment using an audio localization algorithm and provide the detected talker location, or corresponding audio localization coordinates, to a common aggregator. Typically, the audio localization information obtained by a microphone is relatively accurate with respect to the azimuth and elevation coordinates, but less so for the radius coordinate, or a distance between the audio source and the microphone array. In embodiments, the aggregator can improve the accuracy of the radius or distance information by aggregating or combining time-synchronized audio localization coordinates obtained by multiple microphones for the same audio source (or audio event) to determine an estimated talker location. The estimated talker location can be provided to the camera for positioning an image capturing component of the camera towards the talker. Prior to said transmission, the aggregator may convert the coordinates of the estimated talker location to a coordinate system that is relative to the camera, or to a previously-determined common coordinate system (e.g., a coordinate system that is relative to the room), so that the camera receives the estimated talker location in a format that is understandable and useful to the camera. The camera can utilize the received talker location for moving, zooming, panning, framing, or otherwise adjusting the image and video captured by the camera. In this manner, the systems and methods described herein can be used by the conferencing system to enable the camera to more accurately capture the image and/or video of an active talker, for example.

The systems and methods described herein can also improve the configuration and usage of conferencing systems by using a talker detection component of a camera to obtain a talker location that can be used to steer an audio beam or lobe of a microphone (or microphone array) towards an active talker in an environment. For example, a microphone array can detect a first location of an active talker in the environment using an audio localization algorithm and point a lobe of the microphone array in the direction of the perceived audio source, or the first talker location. As noted above, the radius or distance coordinate in an audio localization may be less accurate than the other coordinates (e.g., azimuth and elevation), such that the talker may be located anywhere along a straight line formed from the microphone array towards the perceived audio source based on the azimuth and elevation coordinates. The systems and methods described herein can be used by the conferencing system to improve the distance coordinate of an audio localization by pointing an image capturing component of the camera towards the first talker location and utilizing a talker detection component, or other suitable image processing algorithm, to identify a human face, e.g., the talker's face, along the line where the talker may be located. In this manner, the camera may determine that the talker is actually at a second location near, or in the general vicinity of, the first talker location. The second, more accurate location can be provided to the microphone array, and the coordinates for that location can be converted to a coordinate system of the microphone array, or other coordinate system that is recognized by the microphone array. Based on the second location, the microphone array can adjust the location of the lobe directed towards the first talker location, or otherwise steer the lobe towards the second location. Thus, the systems and methods described herein can be used by the conferencing system to enable the microphone array to improve a beamforming accuracy of the array for capturing an active talker, for example.

In addition, the systems and methods described herein can improve the configuration and usage of conferencing systems by determining, in an environment with multiple cameras and multiple microphones, which of the cameras and which of the microphones are best suited for capturing video and audio, respectively, of a given talker. Typically, when there are multiple microphones, each with multiple audio beam or lobe locations, and multiple cameras present, it can be difficult to identify a unique talker in the environment, as well as which camera to point towards the talker. The systems and methods described herein can be used by the conferencing system to determine or identify the location of an active talker based on audio source localization information obtained by two or more of the microphones. Based on said talker location, the conferencing system can select the lobe and corresponding microphone that is best-suited to capture audio produced at the identified talker location. The conferencing system can then select the camera that can optimally capture video of the talker, specifically the talker's face, at the selected lobe location. Also, the talker location can be converted to a coordinate system of the camera, or other common coordinate system, and transmitted to the camera for positioning an image capturing component of the camera towards the talker location. In this manner, the systems and methods described herein can be used by the conferencing system to automatically identify which microphone and/or lobe and camera should be focused on each unique talker in the environment, i.e. without requiring manual installation or setup by one or more users.

As used herein, the terms "lobe" and "microphone lobe" refer to an audio beam generated by a given microphone array (or array microphone) to pick up audio signals at a select location, such as the location towards which the lobe is directed. While the techniques disclosed herein are described with reference to microphone lobes generated by array microphones, the same or similar techniques may be utilized with other forms or types of microphone coverage (e.g., a cardioid pattern, etc.) and/or with microphones that are not array microphones (e.g., a handheld microphone, boundary microphone, lavalier microphones, etc.). Thus, the term "lobe" is intended to cover any type of audio beam or coverage.

FIGS. 1 and 2 depict an exemplary environment 10 in which one or more of the systems and methods disclosed herein may be used. As shown, the environment 10 comprises a conferencing system 100 that can be utilized to determine a location of a talker 102 in the environment 10 for beamforming and/or camera positioning purposes, in accordance with embodiments. It should be understood that while FIGS. 1 and 2 illustrate one potential environment, the systems and methods disclosed herein may be utilized in any applicable environment, including but not limited to conference rooms, offices, huddle rooms, theaters, arenas, music venues, etc.

As shown, the conferencing system 100 comprises a plurality of microphones 104, at least one camera 106, and an aggregator 108. The system 100 may also include various components not shown in FIGS. 1 and 2, such as, for example, one or more loudspeakers, tabletop microphones, display screens, and/or computing devices. In embodiments, one or more of the components in the system 100 may include one or more digital signal processors or other processing components, controllers, wireless receivers, wireless transceivers, etc. In addition, the environment 10 may include one or more other persons, besides the talker 102, and/or other objects (e.g., musical instruments, phones, tablets, computers, HVAC equipment, etc.) that are not shown. It should be understood that the components shown in FIGS. 1 and 2 are merely exemplary, and that any number, type, and placement of the various components in the environment 10 are contemplated and possible.

The microphones 104 may be microphone arrays (also referred to as "array microphones") or any other type of microphone, including non-array microphones, such as directional microphones (e.g., lavalier, boundary, handheld, etc.) and others. The types of transducers (e.g., microphones and/or loudspeakers) and their placement in a particular environment may depend on the locations of the audio sources, listeners, physical space requirements, aesthetics, room layout, stage layout, and/or other considerations. For example, one or more microphones may be placed on a table, lectern, or other surface near the audio sources or attached to the audio sources, e.g., a performer. Microphones may also be mounted overhead or on a wall to capture the sound from a larger area, e.g., an entire room. The microphones 104 shown in FIGS. 1 and 2 may be placed in any suitable location, including on a wall, ceiling, table, and/or any other surface in the environment 10. Similarly, loudspeakers may be placed on a wall, ceiling, or table surface in order to emit sound to listeners in the environment 10, such as sound from the far end of a conference, pre-recorded audio, streaming audio, etc. The microphones and loudspeakers may conform to a variety of sizes, form factors, mounting options, and wiring options to suit the needs of particular environments. In the illustrated embodiment, the microphones 104 may be positioned at different locations in the environment 10 in order to adequately capture sounds throughout the environment 10.

In cases where the environment 10 is a conference room, the environment 10 may be used for meetings, conference calls, or other events where local participants in the room communicate with each other and/or with remote participants. In such cases, the microphones 104 can detect and capture sounds from audio sources within the environment 10. The audio sources may be the local participants, e.g., human talker 102 shown in FIG. 1, and the sounds may be speech spoken by the local participants, or music or other sounds generated by the same. In a common situation, the local participants may be seated in chairs at a table, although other configurations and locations of the audio sources are contemplated and possible.

The camera 106 can capture still images and/or video of the environment 10 where the conferencing system 100 is located. In some embodiments, the camera 106 may be a standalone camera, while in other embodiments, the camera 106 may be a component of an electronic device, e.g., smartphone, tablet, etc. In some cases, the camera 106 may be included in the same electronic device as one or more of the aggregator 108 and the microphones 104. The camera 106 may be a pan-tilt-zoom (PTZ) camera that can physically move and zoom to capture desired images and video, or may be a virtual PTZ camera that can digitally crop and zoom images and videos into one or more desired portions. The system 100 may also include a display, such as a television or computer monitor, for example, for showing other images and/or video, such as the remote participants of a conference or other image or video content. In some embodiments, the display may include one or more microphones, cameras, and/or loudspeakers, for example, in addition to or including the microphones 104 and/or camera 106.

Figure 3:
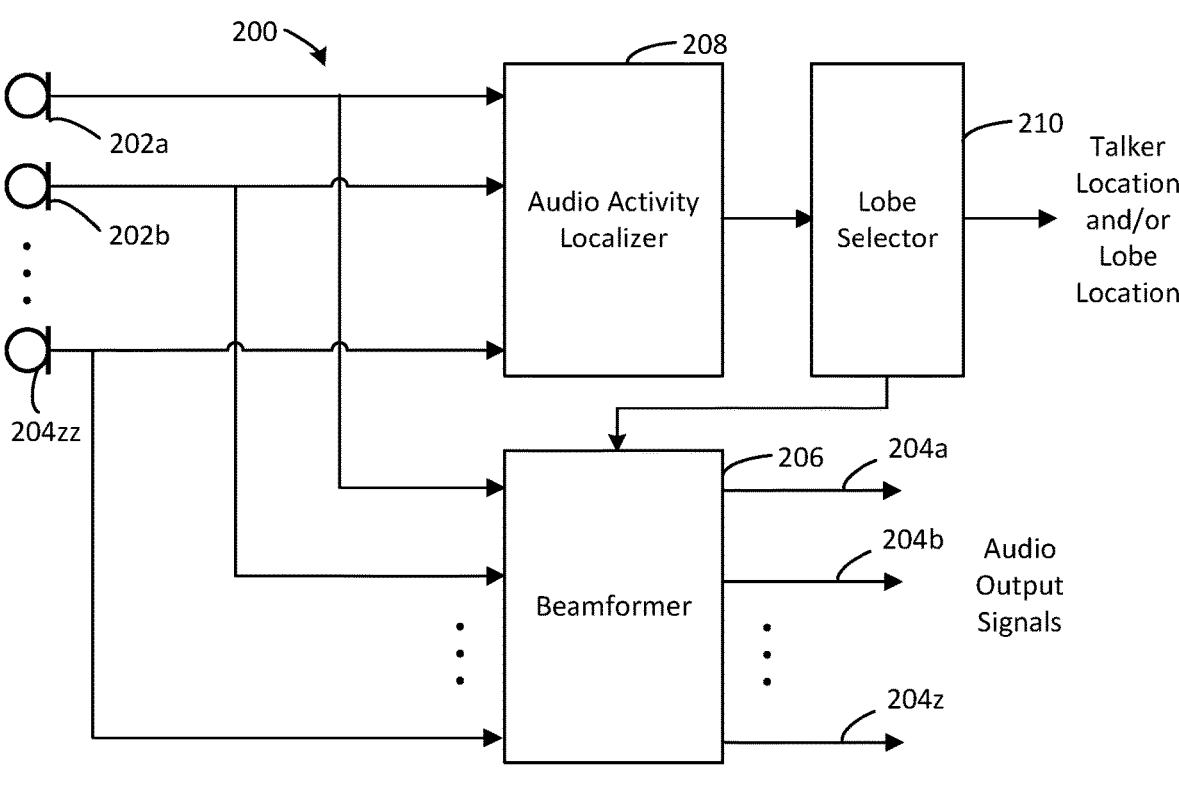
FIG. 3 is a block diagram of an exemplary microphone array that is configured to detect audio activity in an environment and is usable with the conferencing system of FIGS. 1 and 2, in accordance with one or more embodiments.

Referring additionally to FIG. 3, shown is an exemplary microphone array 200 that may be either one of the microphones 104 and may be usable with the conferencing system 100 shown in FIGS. 1 and 2, in accordance with embodiments. The microphone array 200 comprises a plurality of microphone elements 202*a,b,* . . . *zz* (or microphone transducers) and can form one or more pickup patterns with lobes, so that sound from audio sources, such as sounds produced by the human talker 102 or other objects or talkers in the environment 10, can be detected and captured. In some embodiments, each of the microphone elements 202*a, b,* . . . , *zz* may be a MEMS (micro-electrical mechanical system) microphone with an omnidirectional pickup pattern. In other embodiments, the microphone elements 202*a,b,* . . . , *zz* may have other pickup patterns and/or may be electret condenser microphones, dynamic microphones, ribbon microphones, piezoelectric microphones, and/or other types of microphones. In various embodiments, the microphone elements 202*a,b,* . . . , *zz* may be arrayed in one dimension or multiple dimensions.

In some embodiments, each microphone element 202*a,b,* . . . , *zz* can detect sound and convert the detected sound to an analog audio signal. In such cases, other components in the microphone array 200, such as analog to digital converters, processors, and/or other components (not shown), may process the analog audio signals and ultimately generate one or more digital audio output signals. The digital audio output signals may conform to suitable standards and/or transmission protocols for transmitting audio. In other embodiments, each of the microphone elements 202*a, b,* . . . , *zz* in the microphone array 200 may detect sound and convert the detected sound to a digital audio signal.

As shown in FIG. 3, one or more digital audio output signals 204*a,b,* . . . , *z* may be generated to correspond to each of the one or more pickup patterns. The pickup patterns may be composed of, or include, one or more lobes, e.g., main, side, and back lobes, and/or one or more nulls. The pickup patterns that can be formed by the microphone array 200 may be dependent on the type of beamformer used with the microphone elements, such as beamformer 206. For example, a delay and sum beamformer may form a frequency-dependent pickup pattern based on its filter structure and the layout geometry of the microphone elements. As another example, a differential beamformer may form a cardioid, subcardioid, supercardioid, hypercardioid, or bidirectional pickup pattern. Other suitable types of beamformers may include a minimum variance distortionless response ("MVDR") beamformer, and more. In embodiments, the beamformer 206 may be in wired or wireless communication with the microphone elements 202*a,b,* . . . , *zz*. In some embodiments, the beamformer 206 may be a standalone device that is in communication with the microphone array 200.

The microphone array 200 can also determine a location of a talker or other object in the environment 10 relative to the array 200, or more specifically, a coordinate system of the array 200, based on the sound, or audio activity, detected by the microphone elements 202*a,b,* . . . , *zz*. For example, the microphone array 200 may include an audio activity localizer 208 in wired or wireless communication with the microphone elements 202*a,b,* . . . , *zz*. The audio activity localizer 208 may determine or identify a position or location of audio activity detected in an environment, e.g., the environment 10 of FIG. 1, based on the audio signals received from the microphone elements 202*a,b,* . . . , *zz*, or otherwise localize audio detected by the microphone array 200. In embodiments, the audio activity localizer 208 may utilize a Steered-Response Power Phase Transform (SRP-PHAT) algorithm, a Generalized Cross Correlation Phase Transform (GCC-PHAT) algorithm, a time of arrival (TOA)-based algorithm, a time difference of arrival (TDOA)-based algorithm, Multiple Signal Classification (MUSIC) algorithm, an artificial intelligence-based algorithm, a machine learning-based algorithm, or another suitable audio or sound source localization algorithm to determine a direction of arrival of the detected audio activity and generate an audio localization or other data that represents the location or position of the detected sound relative to the microphone array 200. The detected audio activity may include audio sources, such as human talkers, e.g., talker 102 in FIG. 1, or an acoustical trigger from or near a camera, e.g., camera 106 in FIG. 1. As will be appreciated, the location obtained by the sound source localization algorithm may represent a perceived location of the audio activity or other estimate obtained based on the audio signals received from the microphone elements 202a,b, . . . , zz, which may or may not coincide with the actual or true location of the audio activity.

The audio activity localizer 208 may be configured to indicate the location of the detected audio activity as a set of three-dimensional coordinates relative to the location of the microphone array 200, or in a coordinate system where the microphone array 200 is the origin of the coordinate system. The coordinates may be Cartesian coordinates (i.e., x, y, z), or spherical coordinates (i.e., azimuthal angle φ (phi or "az"), elevation angle θ (theta or "elev"), radial distance/magnitude (R)). It should be noted that Cartesian coordinates may be readily converted to spherical coordinates, and vice versa, as needed. The spherical coordinates may be used in various embodiments to determine additional information about the conferencing system 100 of FIGS. 1 and 2, such as, for example, a distance between the audio source 102 and a given microphone 104, a distance between the two microphones 104, a distance between a given microphone 104 and the camera 106, and/or relative locations of the camera 106 and/or the microphone(s) 104 within the environment 10.

In the illustrated embodiment, the audio activity localizer 208 is included in the microphone array 200. In other embodiments, the audio activity localizer 208 may be included in another component of the conferencing system 100, or may be a standalone component. In various embodiments, the detected talker locations, or more specifically, the localization coordinates representing each location, may be transmitted to one or more other components of the conferencing system, such as the aggregator 108 and/or the camera 106 of FIG. 1.

In various embodiments, the location data generated by the audio activity localizer 208 also includes a timestamp or other timing information to indicate the time at which the coordinates were generated, an order in which the coordinates were generated, and/or any other information to help identify coordinates that were generated simultaneously, or nearly simultaneously, for the same audio source. In some embodiments, the microphones 104 in the conferencing system 100 have synchronized clocks (e.g., using Network Time protocol or the like). In other embodiments, the timing, or simultaneous output, of the coordinates may be determined using other techniques, such as, for example, setting up a time-synchronized data channel for transmitting the localization coordinates from the microphones 104 to the aggregator 108, and more.

As shown in FIG. 3, the microphone array 200 may also include a lobe selector 210 in wired or wireless communication with the audio activity localizer 208. The microphone array 200 may be capable of forming one or more pickup patterns with lobes that can be steered to sense audio in particular locations within an environment. The audio activity localizer 208 may send location data comprising a talker location, or audio localization coordinates obtained by the localizer 208 for a detected talker, to the lobe selector 210 for selecting the lobe that can optimally capture the talker location. For example, the lobe selector 210 may determine which of a plurality of lobes of the microphone array 200 is best suited for picking up or capturing audio at the coordinates determined by the audio activity localizer 208 based on distance (e.g., a distance between the microphone array 200 and the talker location), availability of the lobe, the coverage area assigned to each lobe, and/or any other suitable factor. A location of the selected lobe may be provided to the beamformer 206 for deploying an audio pick-up beam towards the indicated lobe location. The lobe location may be a set of coordinates in a coordinate system relative to the microphone array 200, or any other suitable format. In various embodiments, location data comprising the location of the selected lobe may also be transmitted to one or more other components of the conferencing system, such as the aggregator 108 and/or the camera 106 of FIGS. 1 and 2.

Referring back to FIGS. 1 and 2, the aggregator 108 can be configured to receive time-synchronized talker locations and/or lobe locations from one or more of the microphones 104, and based thereon, provide coordinates or other location information to the camera 106 for positioning the camera 106 towards the talker 102. In some embodiments, the location data (or localization coordinates) received at the aggregator 108 may be relative to a coordinate system of the microphone 104 that generated the data. In such cases, where the relative positions and orientations of the microphones 104 and/or the camera 106 in the environment 10 are known, a coordinate-system transformation can be derived based thereon for converting the location data generated by the microphone 104 to a coordinate system of the receiving component, such as, e.g., the camera 106, or other common coordinate system for the environment 10.

In various embodiments, the aggregator 108 may include a conversion unit (not shown) configured to convert the location data from its original coordinate system (e.g., relative to the microphone 104) to another coordinate system that is readily usable by the camera 106, prior to transmitting the location data to the camera 106. For example, the conversion unit may be configured to convert localization coordinates in a first coordinate system that is relative to a first microphone array of the plurality of microphones 104 (e.g., where the first microphone array 104 is the origin of the first coordinate system) to localization coordinates in a second coordinate system that is relative to the camera 106 (e.g., where the camera 106 is the origin of the second coordinate system). In other embodiments, the conversion unit may be included in each of the microphones 104, so that the localization coordinates generated by each microphone 104 can be converted to a coordinate system of the intended recipient (e.g., the camera 106) prior to being transmitted to the aggregator 108.

In some cases, the conversion unit may be configured to convert the location data received at the aggregator 108 to a common coordinate system associated with the environment 10, such as, e.g., a coordinate system that is relative to the room in which the conferencing system 100 is located, so that the location data is readily usable by any component of the conferencing system 100. In such embodiments, each component of the conferencing system 100 (e.g., the microphones 104 and the camera 106) may also include a conversion unit for converting any received location data (or coordinates) to the coordinate system of that component for easier processing and usability.

In some cases, the conversion unit included in the aggregator 108 may convert location data received from the camera 106 into another coordinate system of the environment 10, prior to transmitting the received data to another component of the system 100. For example, a talker location in the coordinate system that is relative to the camera 106 may be converted to a talker location in the coordinate system that is relative to one of the microphones 104 and/or a common coordinate system of the environment 10.

In various cases, the aggregator 108 may combine time-synchronized localizations from two different microphones 104 to obtain a more accurate estimate of the talker location, as described herein. In such cases, where the relative positions and orientations of the microphones 104 in the environment 10 are known, a coordinate system transformation can be derived based thereon for converting the location data generated by a first microphone array of the plurality of microphones 104 to a coordinate system of a second microphone array of the plurality of microphones 104, or other common coordinate system for the environment 10. For example, the aggregator 108 may convert location data in the coordinate system of the first microphone 104 (e.g., x, y, z) to location data in a coordinate system of the second microphone 104 (e.g., x', y', z'), prior to combining the location coordinates.

In some embodiments, the conversion unit, whether located in the aggregator 108 or another component of the system 100, may also be configured to convert lobe locations received from a given microphone 104 into another coordinate system of the environment 10, prior to transmitting the lobe locations to the camera 106 or other component of the system 100. For example, a lobe location in the coordinate system that is relative to the first microphone 104 may be converted to a lobe location in the coordinate system that is relative to the camera 106.

Referring now to FIGS. 1 and 2, during operation, a first one of the microphones 104 may send, to the aggregator 108, a first talker location (e.g., x1, y1, z1) that represents localization of a sound produced by a given audio source (e.g., the talker 102) at a first point in time, as perceived or detected by the first microphone 104. Likewise, a second one of the microphones 104 may send, to the aggregator 108, a second talker location (e.g., x2, y2, z2) that corresponds to the same audio event, i.e. represents localization of the same sound, at approximately the same point in time, as perceived by the second microphone 104. As will be appreciated, in some cases, both microphones 104 may localize the talker 102 to the same location or position in the environment 10, while in other cases, the microphones 104 may localize the talker 102 to different locations in the environment 10, for example, as shown in FIGS. 1 and 2. In the latter case, the aggregator 108 can combine the time-synchronized localizations from multiple microphones 104 to obtain (or triangulate) an estimated talker location with higher accuracy than the individual talker locations. The aggregator 108 may use one or more different techniques to calculate the estimated talker location depending on how close the two localizations are to each other, how much overlap there is between them, and/or other relevant considerations. The aggregator 108 can thus provide a more precise location of the talker 102 to the camera 106 and minimize or avoid erroneous camera positioning.

More specifically, in FIG. 1, the localization of a sound produced by the talker 102 and detected by the first microphone 104 is represented by a first line, L1, drawn from the first microphone 104 to the first talker location (e.g., point P1 in FIG. 1). Likewise, the localization of the same sound, as detected by the second microphone 104, is represented by a second line, L2, drawn from the second microphone 104 to the second talker location (e.g., point P2 in FIG. 1), that is different from the first talker location. For example, the first talker location (az1, elev1, R1) and the second talker location (az2, elev2, R2) may have different radius or distance coordinates ("R") but the same or similar azimuth ("az") and elevation ("elev") coordinates. Thus, the two lines, L1 and L2, may end at different positions in the environment 10, neither of which may be the true or actual location of the talker 102. Instead, the true location of the talker 102 (e.g., point P3 in FIG. 1) may be located at a different radius coordinate along each of the lines L1 and L2.

It should be appreciated that the straight lines shown in FIGS. 1 and 2 are intended to represent the detected talker locations in three-dimensional space and may be constructed based on the coordinates received at the aggregator 108. For example, each audio localization, n, may be represented using a straight line that starts from the microphone 104 that produced the localization, i.e. coordinates (az, elev, R), and extends into three-dimensional space at an angle specified by the azimuth and elevation coordinates of the localization, the line ending at a point indicated by the radius coordinate of the same localization. The aggregator 108 may calculate each line, L(n), using the following equation: $L(n)=P(n)+t(n)*V(n)$, where $P(n)$ is a point on the line $L(n)$ and $V(n)$ is the directional vector of line $L(n)$. Prior to such calculations, the aggregator 108 may first convert the received coordinates to a common coordinate system (e.g., a coordinate system of one of the microphones 104 or the environment 10, etc.), and/or spherical coordinates, as needed.

While talker locations with imprecise radius coordinates can still be used to steer a microphone lobe towards the general location of an active audio source with relative success, a higher level of accuracy is needed for camera positioning. For example, in FIG. 1, directing the camera 106 towards point P1 or point P2 would not properly capture the face of the talker 102, which may be located at point P3. As another example, in some cases, the camera 106 may be configured to follow an active talker as they move about the room, including if they go from sitting or standing, or vice versa, so that the active talker is always within a frame or viewing angle of the camera 106.

In embodiments, the aggregator 108 is configured to improve an audio localization accuracy of the conferencing system 100 by determining an estimated location of the talker 102 in the environment 10 based on two or more time-synchronized localizations (or location coordinates) generated by two or more different microphones 104 for the same audio activity or event. Various linear-algebraic techniques may be used to calculate or determine the estimated talker location, as shown in FIGS. 1 and 2 and described herein. Other techniques for estimating a true talker location may also be used, in addition to or instead of aggregating audio localizations obtained by the microphones 104. For example, in some cases, the aggregator 108 may be configured to improve a quality of the localization data that is used for camera positioning by using a voice activity detection technique to prevent the localization of noise in the environment 10 and/or transmitting only those coordinates that are in a predetermined vicinity of current lobe positions and/or within a pre-defined audio coverage area of the environment 10. As another example, the aggregator 108 may be configured to improve localization quality by filtering out (or not transmitting) successive coordinates of nearby positions, or other micro-changes due to auto-focus activity of a particular lobe, to minimize jitteriness of the camera 106 as an active talker moves their head or mouth. In such cases, a significant movement of, or considerable change in, the detected talker location may be required before the camera 106 moves to the new location, and until that occurs, a constant value may be provided to the camera 106 to prevent or minimize jitteriness. As another example, the aggregator 108 may be configured to improve localization quality by transmitting coordinates for multiple localizations at once, at a pre-defined rate and organized according to lobe vicinity, coverage area affiliation, priority (e.g., head of the table, keynote speaker, company CEO, etc.), and/or other relevant factors.

Referring first to FIG. 1, in some embodiments, the aggregator 108 may determine the estimated talker location by identifying a common point based on the first and second talker locations, such as, e.g., an intersection of the first line L1 and the second line L2. For example, the aggregator 108 may determine an intersection point, P3, of the lines L1 and L2 by equating the line equations (e.g., P1+t1*V1=P2+t2*V2) and solving for t1, t2, where t1=t2. Other techniques may also be used for combining or aggregating the first talker location and the second talker location to identify a common point, as will be appreciated.

In other embodiments, for example, as shown in FIG. 2, the aggregator 108 may determine the estimated talker location by identifying a nearest or optimal point based on the detected talker locations, or a point of minimum distance between the regions bounded by the azimuth and elevation coordinates of the talker locations detected by the microphones 104. This technique may be especially useful in situations where the lines representing the detected talker locations are skewed and thus, do not intersect due to inaccuracies in the azimuth and/or elevation angles detected by the microphones 104 and/or other mismatches. For example, in FIG. 2, a third line L3 constructed based on a third talker location (az3, elev3, R3) detected by the first microphone 104 does not intersect with a fourth line L4 constructed based on a fourth talker location (az4, elev4, R4) detected by the second microphone 104. Moreover, the third line L3 ends at point P4, while the fourth line L4 ends at point P5, neither of which corresponds to the true talker location (e.g., point P3).

In such cases, the aggregator 108 may determine an estimated talker location based on the detected talker locations by locating a point that is closest to both lines L3 and L4, or otherwise finding a point of minimum distance (or error) that takes into account the uncertainties in the radius coordinate, R. For example, the aggregator 108 may be configured to resolve the inaccurate radius coordinate by finding the closest point on line L3 to line L4 (e.g., point P4 in FIG. 2) and the closest point on line L4 to line L3 (e.g., point P5), and drawing a new line segment, L5, between lines L3 and L4 that connects the two closest points. The line segment L5 may be perpendicular to both of the lines L3 and L4. The aggregator 108 may calculate the line segment L5 using the equation L5=P4+t4*V4+t6*V6, where V6=V2*V1 and is a vector perpendicular to both P4 and P5. Knowing that the line segment L5 should contain a point such that P4+t4*V4+t6*V6=P5+t5*V5, the aggregator 108 can solve for t4, t5, t6, where t4=t5=t6, and determine the unknown values. Once the line segment L5 is drawn, the aggregator 108 identifies the midpoint (e.g., point Pm in FIG. 2) of the line segment L5 as being the estimated talker location, or the point on the line segment L5 that is most likely to be the location of the audio source. In various embodiments, the audio localizations received at the aggregator 108 may be converted into a common coordinate system (e.g., the coordinate system of the first microphone 104 or the environment 10, etc.) and/or converted from Cartesian coordinates (x, y, z) into spherical coordinates (az, elev, R), as needed, prior to calculating the estimated talker location.

In some cases, the audio localization obtained by a given microphone 104 (or microphone array) may represent a three-dimensional area or region in the environment 10, rather than a straight line, if the coordinates of the audio localization include azimuth and/or elevation angles are less precise or contain slight inaccuracies. For example, the audio localization may point to a broader region or area, such as, e.g., an oblong, cylindrical, or conical region, that includes (or is centered on) the corresponding straight line L(n). In various embodiments, the techniques described herein may also be used to calculate an estimated talker location based on such audio localizations (or "localized regions"). For example, the aggregator 108 may be configured to identify an intersection of the localized regions that is a three-dimensional area bound by the coordinates of the corresponding time-synchronized audio localizations and their deviations. In some embodiments, the aggregator 108 may provide the intersection, or overlapping region, as the estimated talker location. In other embodiments, the aggregator 108 may further identify a point within the overlapping region using one or more of the techniques described herein, and provide the identified point as the estimated talker location. For example, the estimated talker location may be a central point of the overlapping region, or a point within the overlapping region that is nearest to both localized regions (e.g., a nearest point).

Figure 4:
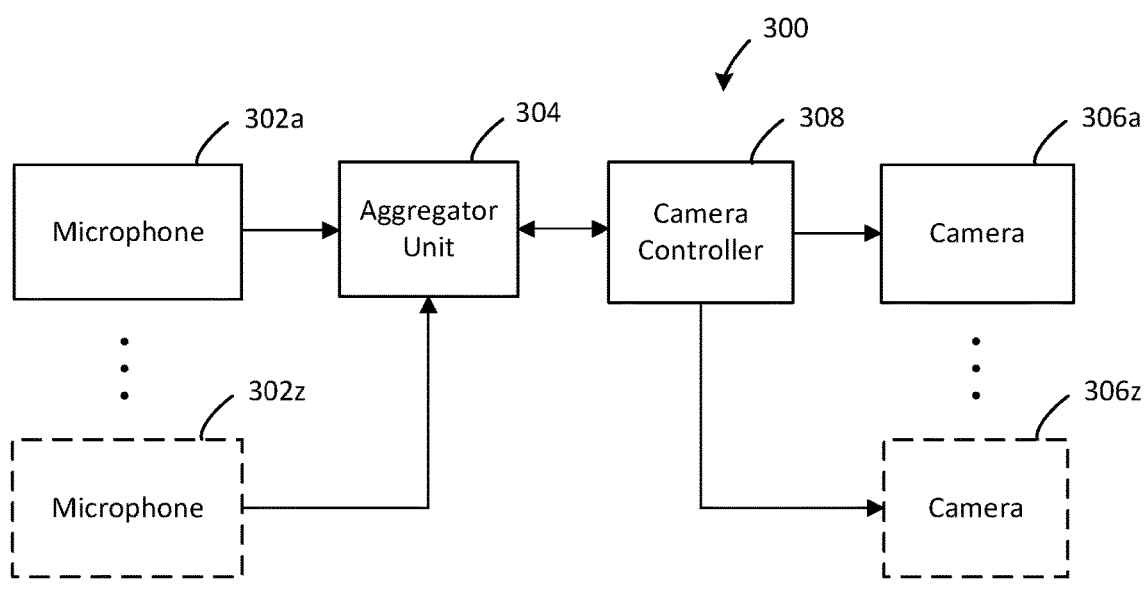
FIG. 4 is a block diagram of an exemplary conferencing system with multiple microphones and/or multiple cameras that is usable as any of the conferencing systems described herein, in accordance with one or more embodiments.

FIG. 4 depicts a system 300 (e.g., conferencing system) that is usable as the conferencing system 100 shown in the environment 10 of FIGS. 1 and 2, or any of the other conferencing systems described herein (e.g., conferencing system 700 in FIGS. 8-10), in accordance with embodiments. The system 300 may include multiple microphones 302a, . . . , z (e.g., microphones 104 of FIG. 1) that can detect and capture sounds from audio sources within an environment (e.g., talker 102 of FIG. 1). The microphones 302a, . . . z can also detect or determine a location of the detected audio sources in the environment (e.g., environment 10 of FIG. 1). The system 300 may also include an aggregator unit 304 (e.g., aggregator 108 of FIG. 1) that can receive the detected locations from the microphones 302a, . . . , z and determine an estimated talker location based on the received locations. The system 300 may further include one or more cameras 306a, . . . , z (e.g., camera 106 of FIG. 1) that can capture images and/or video of the environment 10, including an active talker (e.g., talker 102 of FIG. 1) in the environment, and may be controlled by a camera controller 308 of the system 300. The aggregator unit 304 may provide the estimated talker location to the camera controller 308 for positioning at least one camera 306a, . . . , z towards the estimated talker location. The camera controller 308 may provide appropriate signals to the at least one camera 306a, . . . z to cause the camera(s) 306a, . . . z to move and/or zoom towards the active talker, for example. In some embodiments, the camera controller 308 and/or the cameras 306a, . . . , z may be configured to move with the active talker as they move about the environment (or room).

In some embodiments, one of the microphones 302a, . . . , z may act as the aggregator unit 304. In other embodiments, the aggregator unit 304 and the camera controller 308 may be included in the same device (e.g., a computing device). In still other embodiments, the camera controller 308 and one of the cameras 306*a*, . . . , *z* may be integrated together. The components of the system 300 may be in wired and/or wireless communication with each other and/or other components of the system 100.

Each of the microphones 302*a*, . . . , *z* may detect a sound in the environment 10 and determine the location of the sound in a coordinate system that is relative to itself, or has the given microphone 302*a*, . . . , *z* as its origin, for example. The sound may be produced by a talker (e.g., talker 102 of FIG. 1), an object (e.g., one or more cameras 306*a*, . . . , *z*, etc.), or any other audio source in the environment 10. Each microphone 302*a*, . . . *z* may transmit the location of a detected sound (or "detected talker location") in its respective coordinate system to the aggregator unit 304. In some cases, one or more of the microphones 302*a*, . . . , *z* may transmit, to the aggregator unit 304, the location of a lobe deployed by the one or more microphones 302*a*, . . . , *z*, in its respective coordinate system. The lobe may have been deployed, for example, based on the detected talker location.

Thus, the aggregator unit 304 may receive, from each microphone 302*a*, . . . , *z*, a detected talker location and/or a lobe location of the microphone 302*a*, . . . *z*. Each location received by the aggregator unit 304 may be in a respective coordinate system of the microphone 302*a*, . . . *z* that provided the location. Accordingly, the aggregator unit 304 may convert the received locations into a common coordinate system that is readily usable by the aggregator unit 304 to perform one or more calculations, and/or readily usable by one or more of the cameras 306*a*, . . . , *z* for camera positioning. The common coordinate system may be a coordinate system that is relative to a given camera 306*a*, . . . *z*, a coordinate system of the room or environment in which the camera 306*a*, . . . , *z* is located, or a coordinate system of another component of the system 300, such as, e.g., the aggregator unit 304, one of the microphones 302*a*, . . . , *z*, etc. In other embodiments, conversion of locations into a common coordinate system may be performed by another component included in, or in communication with, the system 300, such as, for example, a computing device (not shown), a remote computing device (e.g., a cloud-based device), and/or any other suitable device.

For example, as described herein, the aggregator unit 304 may calculate or determine an estimated talker location based on time-synchronized detected talker locations received from two or more microphones 302*a*, . . . , *z*. In such cases, the aggregator unit 304 may convert the detected talker locations received from individual microphones 302*a*, . . . , *z*, to a first common coordinate system associated with one of the microphones 302*a*, . . . , *z* (e.g., a coordinate system of a first microphone 302*a*), and may calculate the estimated talker location in the first common coordinate system. Prior to transmitting the estimated talker location to the camera controller 308, the aggregator unit 304 may convert the estimated talker location from the first common coordinate system to a second common coordinate system associated with one of the cameras 306*a*, . . . , *z* (e.g., a coordinate system of the camera 306*a*), so that the estimated talker location is readily usable by that camera 306*a*, . . . , *z*. In some cases, the aggregator unit 304 may also transmit, to the camera controller 308, the locations of the microphones 302*a*, . . . , *z* that detected the sound, or otherwise generated the detected sound locations. In such cases, the aggregator unit 304 may also convert the location of each microphone 302*a*, . . . , *z* to the common coordinate system that is readily usable by the camera(s) 306*a*, . . . , *z*.

In embodiments, the aggregator unit 304 and the camera controller 308 may communicate via a suitable application programming interface (API), which may enable the camera controller 308 to query the aggregator unit 304 for the location of a particular microphone 302*a*, . . . , *z*, enable the aggregator unit 304 to transmit signals to the camera controller 308, and/or enable the camera controller 308 to transmit signals to the aggregator unit 304. For example, in some cases, the aggregator unit 304 may transmit the converted locations to the camera controller 308 in response to a query from the camera controller 308 over the API. Similarly, each microphone 302*a*, . . . , *z* may be configured to communicate with the aggregator unit 304 using a suitable API, which may enable the microphone 302*a*, . . . , *z* to transmit localization coordinates to the aggregator unit 304 upon receiving a query from the aggregator unit 304.

The camera controller 308 can receive the locations of the microphones 302*a*, . . . , *z*, the lobe location(s), and/or the estimated talker location from the aggregator unit 304. Based on the received locations, the camera controller 308 may select which of the cameras 306*a*, . . . , *z* to utilize for capturing images and/or video of a particular location, e.g., where an active talker is located. The camera controller 308 may provide appropriate signals to the selected camera 306*a*, . . . , *z* to cause the camera 306*a*, . . . , *z* to move and/or zoom. For example, the camera controller 308 may utilize the locations of the microphones 302*a*, . . . , *z*, the received lobe locations, and/or the estimated talker location in the coordinate system of the camera(s) 306*a*, . . . , *z* in order to generate optimized camera parameters that allow more accurate zooming, panning, and/or framing of the talker 102.

It should be understood that the components shown in FIGS. 1 through 4 are merely exemplary, and that any number, type, and placement of the various components of the system 100, the array 200, and/or the system 300 are contemplated and possible. For example, in FIG. 1, there may be multiple cameras 106 and/or a camera controller coupled between the camera(s) 106 and the aggregator 108, as shown in FIG. 3.

Figure 5:
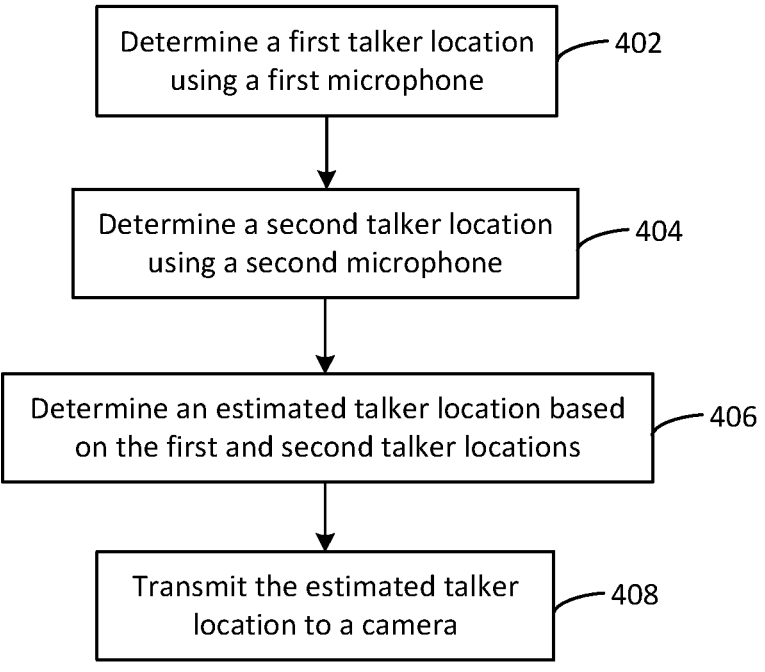
FIG. 5 is a flowchart illustrating exemplary operations for determining an estimated talker location in an environment using talker coordinates obtained by a plurality of microphones, in accordance with one or more embodiments.

FIG. 5 illustrates an exemplary method or process 400 for providing an estimated talker location to a camera based on talker coordinates obtained by a plurality of microphones, in accordance with embodiments. The camera (e.g., camera 106 of FIGS. 1 and 2 and/or camera 306*a*, . . . , *z* of FIG. 3) and the microphones (e.g., microphones 104 of FIGS. 1 and 2 and/or microphones 302*a*, . . . , *z* of FIG. 3) may form part of a conferencing system (e.g., system 100 of FIGS. 1 and 2 and/or system 300 of FIG. 3) located in an environment (e.g., environment 10 of FIGS. 1 and 2). The environment may be a conferencing room, event space, or other area that includes one or more talkers (e.g., talker 102 of FIGS. 1 and 2) or other audio sources. The camera may be configured to detect and capture image and/or video of the talker(s). The microphones may be configured to detect and capture sounds produced by the talker(s) and determine the locations of the detected sounds. The method 400 may be performed by one or more processors of the conferencing system, such as a processor of a computing device included in the system and communicatively coupled to the camera and the microphones. In some cases, the method 400 may be performed by an aggregator (e.g., aggregator 108 of FIG. 1 or aggregator unit 304 of FIG. 4) and/or a camera controller (e.g., camera controller 308 of FIG. 4) included in the conferencing system.

As shown in FIG. 5, the method 400 may include, at step 402, determining, using a first microphone (or microphone array) and based on audio associated with a talker, a first talker location in a first coordinate system that is relative to the first microphone array. For example, the first coordinate system may be a coordinate system where the first microphone array is at the origin, or any other suitable coordinate system. In embodiments, determining the first talker location includes detecting, using the first microphone array, a sound generated near the first microphone array, such as the audio associated with the talker, and determining a location of the detected sound using an audio localization algorithm executed by an audio activity localizer (e.g., audio activity localizer 208 of FIG. 2) of the first microphone array.

Step 404 includes determining, using a second microphone (or microphone array) and based on the same audio associated with the same talker (e.g., talker 102 of FIG. 1), a second talker location in a second coordinate system that is relative to the second microphone array. For example, the second coordinate system may be a coordinate system where the second microphone array is at the origin, or any other suitable coordinate system. In embodiments, determining the second talker location includes detecting, using the second microphone array, a sound generated near the second microphone array, such as the audio associated with the talker, and determining a location of the detected sound using an audio localization algorithm executed by an audio activity localizer (e.g., audio activity localizer 208 of FIG. 2) of the second microphone array.

Step 406 includes determining, using at least one processor (e.g., a processor of the aggregator 108 of FIG. 1) and based on the first talker location and the second talker location, an estimated talker location in a third coordinate system that is relative to a camera (e.g., camera 106 of FIG. 1). In some embodiments, determining the estimated talker location includes identifying, using the at least one processor, a common point based on the first talker location and the second talker location, for example, as described herein with respect to FIG. 1. In other embodiments, determining the estimated talker location includes identifying, using the at least one processor, a nearest point based on the first talker location and the second talker location, for example, as described herein with respect to FIG. 2.

In embodiments, the method 400 further includes converting the detected talker locations to a common coordinate system before calculating the estimated talker location. The common coordinate system may be relative to the camera, one of the microphone arrays, the room or environment in which the conferencing system is located, or another component of the system. For example, in some embodiments, the method 400 further includes converting, using the at least one processor, the first talker location from the first coordinate system to the second coordinate system; determining, using the at least one processor and based on the first and second talker locations in the second coordinate system, an estimated talker location in the second coordinate system; and converting, using the at least one processor, the estimated talker location from the second coordinate system to the third coordinate system. In other embodiments, the method 400 further includes converting, using the at least one processor, the first talker location from the first coordinate system to the third coordinate system; converting, using the at least one processor, the second talker location from the second coordinate system to the third coordinate system; and determining, using the at least one processor and based on the first and second talker locations in the third coordinate system, the estimated talker location in the third coordinate system.

Step 408 includes transmitting, from the at least one processor to the camera, the estimated talker location in the third coordinate system to cause the camera to point an image capturing component of the camera towards the estimated talker location in the third coordinate system. The camera may point the image capturing component towards the estimated talker location in the third coordinate system by adjusting one or more of an angle, a tilt, a zoom, and a framing of the camera, or any other relevant parameter of the camera.

Figure 6:
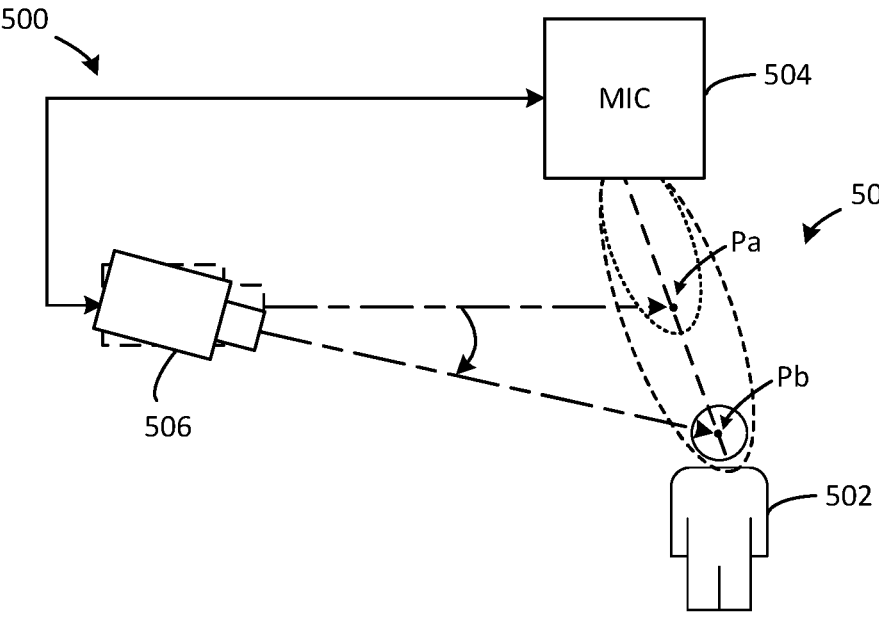
FIG. 6 is a schematic diagram of an exemplary environment comprising a conferencing system that can be utilized to refine a lobe location of a microphone based on a talker location determined by a camera, in accordance with one or more embodiments.

FIG. 6 depicts an exemplary environment 50 in which one or more of the systems and methods disclosed herein may be used. As shown, the environment 50 comprises a conferencing system 500 that can be utilized to detect a location of a talker 502 in the environment 50, direct a lobe of a microphone 504 towards the detected talker location, and refine the lobe location based on a second talker location determined by a camera 506, in accordance with embodiments. It should be understood that while FIG. 6 illustrates one potential environment, the systems and methods disclosed herein may be utilized in any applicable environment, including but not limited to conference rooms, offices, huddle rooms, theaters, arenas, music venues, etc. The system 500 may include various components not shown in FIG. 6, such as, for example, one or more loudspeakers, tabletop microphones, display screens, and/or computing devices. In embodiments, one or more of the components in the system 500 may include a digital signal processor, wireless receivers, wireless transceivers, etc. In addition, the environment 50 may include one or more other persons, besides the talker 502, and/or other objects (e.g., musical instruments, phones, tablets, computers, HVAC equipment, etc.) that are not shown. It should be understood that the components shown in FIG. 6 are merely exemplary, and that any number, type, and placement of the various components in the environment 50 are contemplated and possible.

According to embodiments, the environment 50 may be substantially similar to the environment 10 of FIG. 1, and the conferencing system 500 may be substantially similar to the conferencing system 100 of FIG. 1 and/or may be implemented using the conferencing system 300 of FIG. 4. For example, as shown, the conferencing system 500 comprises a microphone 504, which may be substantially similar to the microphone 104 of FIG. 1, the microphones 302a, . . . , z of FIG. 4, and/or the microphone array 200 of FIG. 3, and at least one camera 506, which may be substantially similar to the camera 106 of FIG. 1 and/or the cameras 306a, . . . , z FIG. 4. Accordingly, the camera 506 and the microphone 504 will not be described in great detail for the sake of brevity. The components of the conferencing system 500 may be in wired or wireless communication with each other and/or with a remote device (e.g., cloud computing server, etc.).

In some embodiments, the system 500 further includes a camera controller (e.g., camera controller 308 of FIG. 4) that receives location information from the microphone 504 and positions the camera 506 towards the received location. In other embodiments, the camera 506 may include the camera controller. The camera controller may point or position the camera towards a particular location (e.g., a talker location) by adjusting one or more of an angle, a tilt, a zoom, and a framing of the camera, or any other suitable setting.

In some embodiments, the system 500 further includes an aggregator (e.g., aggregator unit 304 of FIG. 4) that converts location information received from the microphone 504 to a common coordinate system, prior to providing the location information to the camera 506 for camera positioning. In other embodiments, the aggregator may be included in the microphone 504 or the camera 506. The common coordinate system may be a coordinate system that is centered on the microphone 504, the camera 506, and/or the environment 50, or any other previously-determined coordinate system.

The microphone 504 can detect a sound, or audio activity, in the environment 50 and determine a location of the sound, or the audio source (e.g., talker 502) that produced the sound, relative to the microphone 504, or in a coordinate system of the microphone 504. For example, the microphone 504 may include an audio activity localizer (e.g., audio activity localizer 208 of FIG. 3), or other audio source localization algorithm, configured to determine a set of coordinates (or "localization coordinates") that represents the location of the audio activity in the environment 50 (or "detected talker location"), based on audio signals received from microphone elements (e.g., microphone elements 202*a,b*, . . . , *zz* of FIG. 3) in the microphone 504.

The microphone 504 can also deploy a lobe towards the detected talker location for capturing audio produced by the active talker 502. For example, the microphone 504 may include a lobe selector (e.g., lobe selector 210 of FIG. 3) configured to determine which of a plurality of lobes of the microphone 504 is best suited for picking up or capturing audio at the localization coordinates determined by the audio activity localizer. Accordingly, the audio activity localizer may send the detected talker location, or corresponding audio localization coordinates, to the lobe selector for optimal lobe selection based thereon. The microphone 504 may also include a beamformer (e.g., beamformer 206 of FIG. 3) for deploying an audio pick-up beam towards the location of the selected lobe, which may be provided as a set of coordinates in a coordinate system of the microphone 504.

As described herein, the location obtained by the audio source localization algorithm may represent a perceived location of the audio activity and may actually be an estimate of the audio source location, which may not coincide with an actual or true location of the audio activity. For example, where the localization coordinates are provided as spherical coordinates (az, elev, R), the radius component, R, may be less than accurate, such that the localization point (e.g., point Pa in FIG. 6) does not coincide with the true talker location (e.g., point Pb in FIG. 6). As a result, a lobe deployed towards a talker location detected by the microphone 504 may capture sounds produced by the talker 502 only partially, or not at all, for example, as shown in FIG. 6.

In embodiments, the conferencing system 500 may be configured to use the camera 506 to identify the true location of an active talker, or otherwise improve at least the radius coordinate of the detected talker location obtained by the microphone 504. For example, the microphone 504 may transmit the detected talker location and/or the selected lobe location to the camera 506, either directly or via an aggregator and/or camera controller, as described herein. The location information (e.g., set of coordinates representing the lobe location or the detected talker location) may be relative to a coordinate system of the microphone 504 and thus, may be converted to location information that is relative to a coordinate system of the camera 506. The conversion may be performed by the microphone 504, the camera 506, or any other suitable component of the system 500. In some embodiments, the location information may be converted prior to being transmitted to the camera 506, for example, by the microphone 504 or other component of the system 500.

Upon receiving the location information, the camera 506 may point an image capturing component of the camera 506 towards the received location (e.g., the detected talker location or the lobe location). The image capturing component may be configured to capture still images, moving images, and/or video. In embodiments, the camera 506 may comprise a talker detection component that uses a facial detection algorithm, a human head detection algorithm, or any other suitable image processing algorithm to identify a face, head, or any other identifiable part of the talker 502, or otherwise determine a camera angle that best corresponds to a human face, or the front side of a person, within the vicinity of the received location information. For example, the talker detection component may track motion vectors and scan for a face or head of the talker 502 while the camera 506 moves the image capturing component along a straight line that extends out from the received location (e.g., point Pa) at the same azimuth and elevation angles as the coordinates of the received location. In other cases, the camera 506 may scan nearby regions or areas of the environment 50 in a grid-like manner, until a face or head of the talker 502 is identified. Other known techniques for obtaining a more precise location of the talker 502 may also be used.

As shown in FIG. 6, the camera 506 may identify the face of the talker 502 at a second location (e.g., point Pb) that is a distance away from the received location. In embodiments where the azimuth and elevation components were kept the same, the coordinates of the second location (or "second talker location") may differ from the coordinates of the initial location only in terms of the radius or distance component. In other embodiments, the second talker location may differ from the receive location (e.g., first talker location or lobe location) in terms of the azimuth, elevation, and/or distance components. In either case, the lobe location of the microphone 504 may be adjusted to a new lobe location based on the second talker location, thus enabling the microphone lobe to fully capture audio generated by the talker 502. In particular, the camera 506 may provide the second talker location (or coordinates representing the same) to the microphone 504. The microphone 504 may adjust the lobe location determined by the microphone 504 by changing one or more coordinates of the lobe location based on the received coordinates. For example, the microphone 504 may change or adjust a distance coordinate of the lobe location based on the distance coordinate of the second talker location. If a lobe is already deployed towards the active talker 502, the beamformer of the microphone 504 may steer the lobe towards the adjusted lobe location. If no lobe is deployed, the beamformer may deploy or direct a lobe towards the adjusted lobe location.

In some cases, the second talker location may be in the coordinate system of the camera 506. In such cases, the camera 506 may convert the second talker location to a coordinate system of the microphone 504, prior to transmitting the location information to the microphone 504. In other cases, the second talker location may be transmitted to the microphone 504 as coordinates in the coordinate system of the camera 506. In such cases, the microphone 504 may convert the received coordinates to the coordinate system of the microphone 504, before adjusting the lobe location. In some embodiments, the conversion steps may be performed by one or more other components of the system 500, such as, e.g., an aggregator.

It should be noted that the techniques described herein for refining a lobe location of a microphone using talker coordinates obtained by a camera may also be used in conferencing systems that include multiple microphone arrays, though not shown in FIG. 6. In such cases, the talker coordinates determined using the facial detection algorithm of the camera 506 may be used to steer a select lobe of one of the microphones (or microphone arrays). In some cases, the lobe may be selected based on which lobe and/or microphone array is best-suited to pick-up audio from the talker location detected by the camera 506. In other cases, the lobe may be pre-selected based on localization coordinates obtained by the microphone arrays based on detected audio activity.

Figure 7:
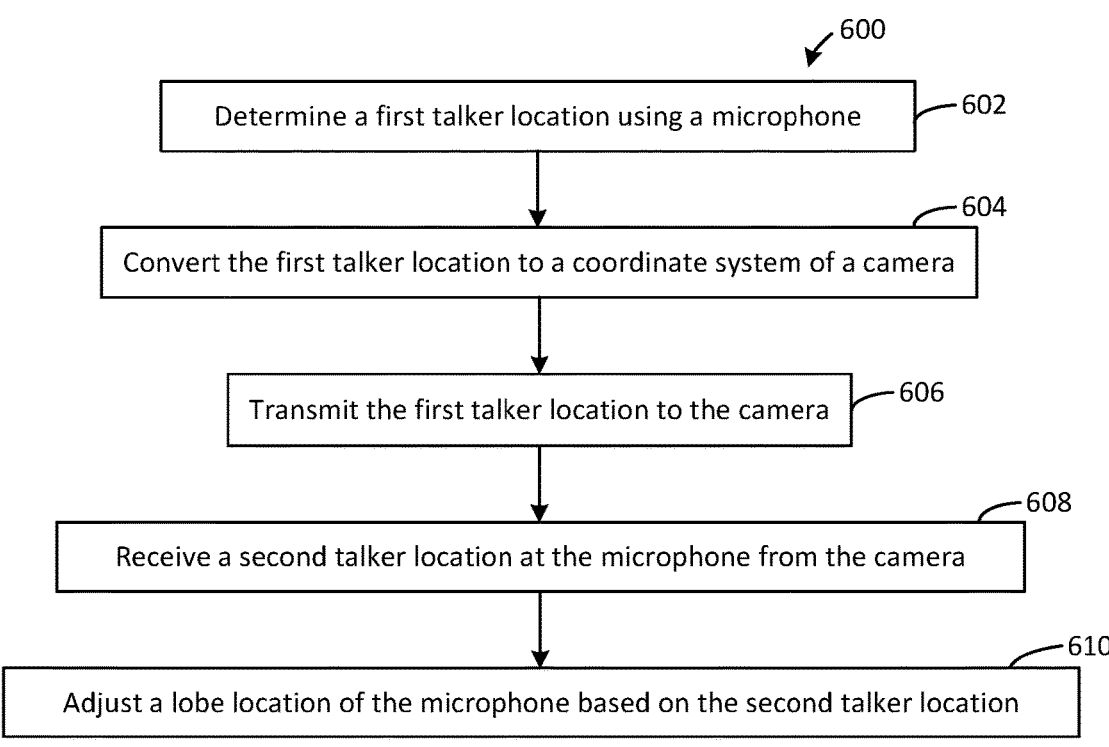
FIG. 7 is a flowchart illustrating exemplary operations for refining a lobe location of a microphone based on a talker location determined by a camera, in accordance with one or more embodiments.

FIG. 7 illustrates an exemplary method or process 600 for refining a lobe location of a microphone (or microphone array) based on a talker location determined by a camera, in accordance with embodiments. The camera (e.g., camera 506 of FIG. 6) and the microphone (e.g., microphone 504 of FIG. 6) may form part of a conferencing system (e.g., system 500 of FIG. 6) located in an environment (e.g., environment 50 of FIG. 6). The environment may be a conferencing room, event space, or other area that includes one or more talkers (e.g., talker 502 of FIG. 6) or other audio sources. The camera may be configured to detect and capture image and/or video of the talker(s). The microphones may be configured to detect and capture sounds produced by the talker(s) and determine the locations of the detected sounds. The method 600 may be performed by one or more processors of the conferencing system, such as a processor of a computing device included in the system and communicatively coupled to the camera and the microphone array. In some cases, the method 600 may be performed by an aggregator (e.g., aggregator unit 304 of FIG. 4) and/or a camera controller (e.g., camera controller 308 of FIG. 4) included in the conferencing system.

As shown in FIG. 7, the method 600 may include, at step 602, determining, using a microphone (or microphone array) and based on audio associated with a talker, a first talker location of the microphone in a first coordinate system that is relative to the first microphone. For example, the first coordinate system may be a coordinate system where the first microphone is at the origin, or any other suitable coordinate system. In embodiments, determining the first talker location includes detecting, using the first microphone, a sound generated near the first microphone, such as the audio associated with the talker, and determining a location of the detected sound using an audio localization algorithm executed by an audio activity localizer (e.g., audio activity localizer 208 of FIG. 3) of the first microphone array.

Step 604 includes converting, using at least one processor, the first talker location from the first coordinate system to a second coordinate system that is relative to a camera. For example, the second coordinate system may be a coordinate system where the camera is at the origin, or any other suitable coordinate system.

Step 606 includes transmitting, from the at least one processor to the camera, the first talker location in the second coordinate system to cause the camera to point an image capturing component of the camera towards the first talker location. As shown in FIG. 6, if the first talker location is not the actual location of the talker, the camera may be pointing away from the active talker and/or may not properly capture the talker. In such cases, the camera may use a talker detection component of the camera to identify a second talker location in the second coordinate system of the camera that is near the first talker location and includes or points to the location of the talker's face. For example, the talker detection component may use a facial detection algorithm, or the like, to identify imagery that resembles a human face, or otherwise detect a face of the active talker, as described herein.

Step 608 includes receiving, from the camera, the second talker location in the second coordinate system that is identified by the camera using the talker detection component of the camera. Step 610 includes adjusting, using the microphone, the lobe location of the microphone based on the second talker location received from the camera. For example, a distance coordinate of the initial lobe location of the microphone may be adjusted or refined based on a distance coordinate of the second talker location determined by the camera. In some cases, the microphone may adjust the lobe location by deploying a new lobe towards the second talker location. In other cases, the microphone may adjust the lobe location by steering the existing lobe towards the second talker location.

In some embodiments, the second talker location may be converted to the first coordinate system of the microphone before adjusting the lobe location of the microphone. For example, in such cases, step 610 may include converting, using the at least one processor, the second talker location from the second coordinate system to the first coordinate system; and adjusting, using the at least one processor, a distance coordinate of the lobe location in the first coordinate system based on a distance coordinate of the second talker location in the first coordinate system.

In other embodiments, the location of the microphone lobe may be converted to the first coordinate system after adjusting the lobe location in the second coordinate system based on the second talker location. For example, in such cases, step 610 includes adjusting, using the at least one processor, a distance coordinate of the lobe location in the second coordinate system based on a distance coordinate of the second talker location in the second coordinate system; and converting, using the at least one processor, the adjusted lobe location from the second coordinate system to the first coordinate system.

Figure 8:
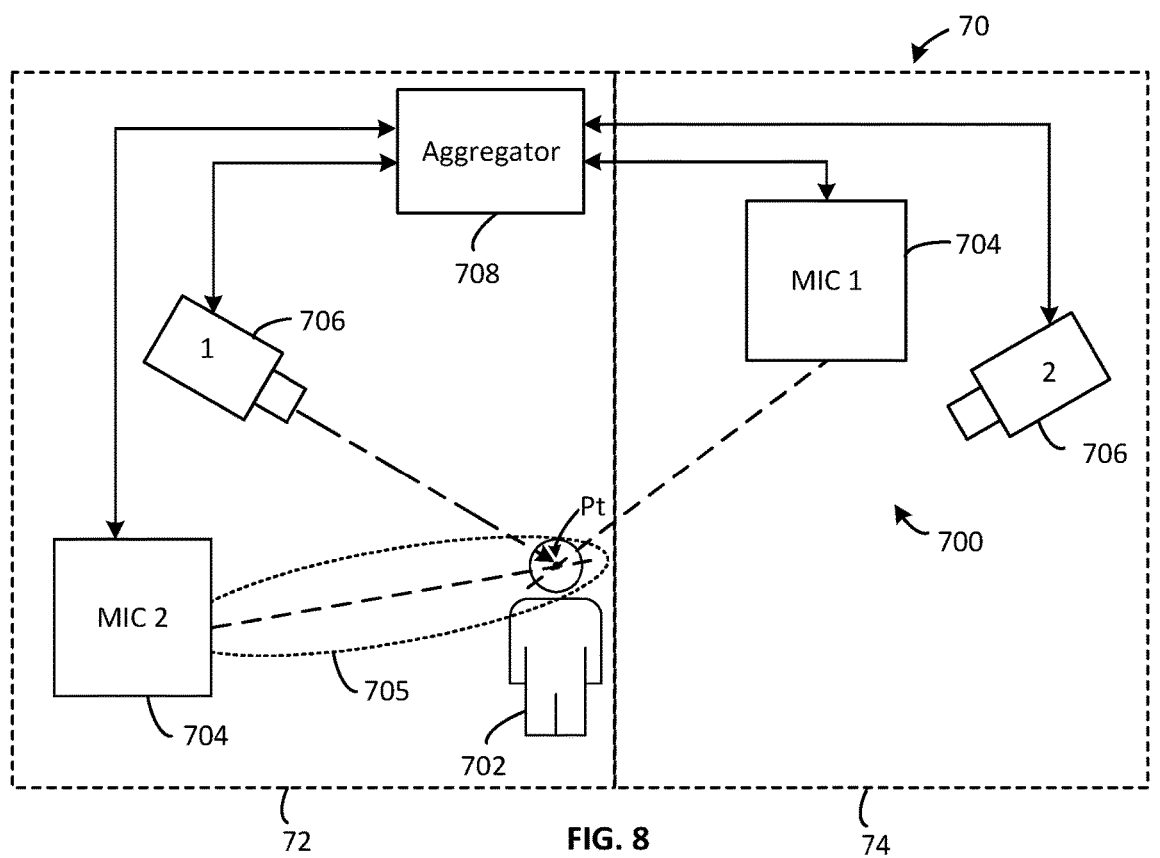
Figure 9:
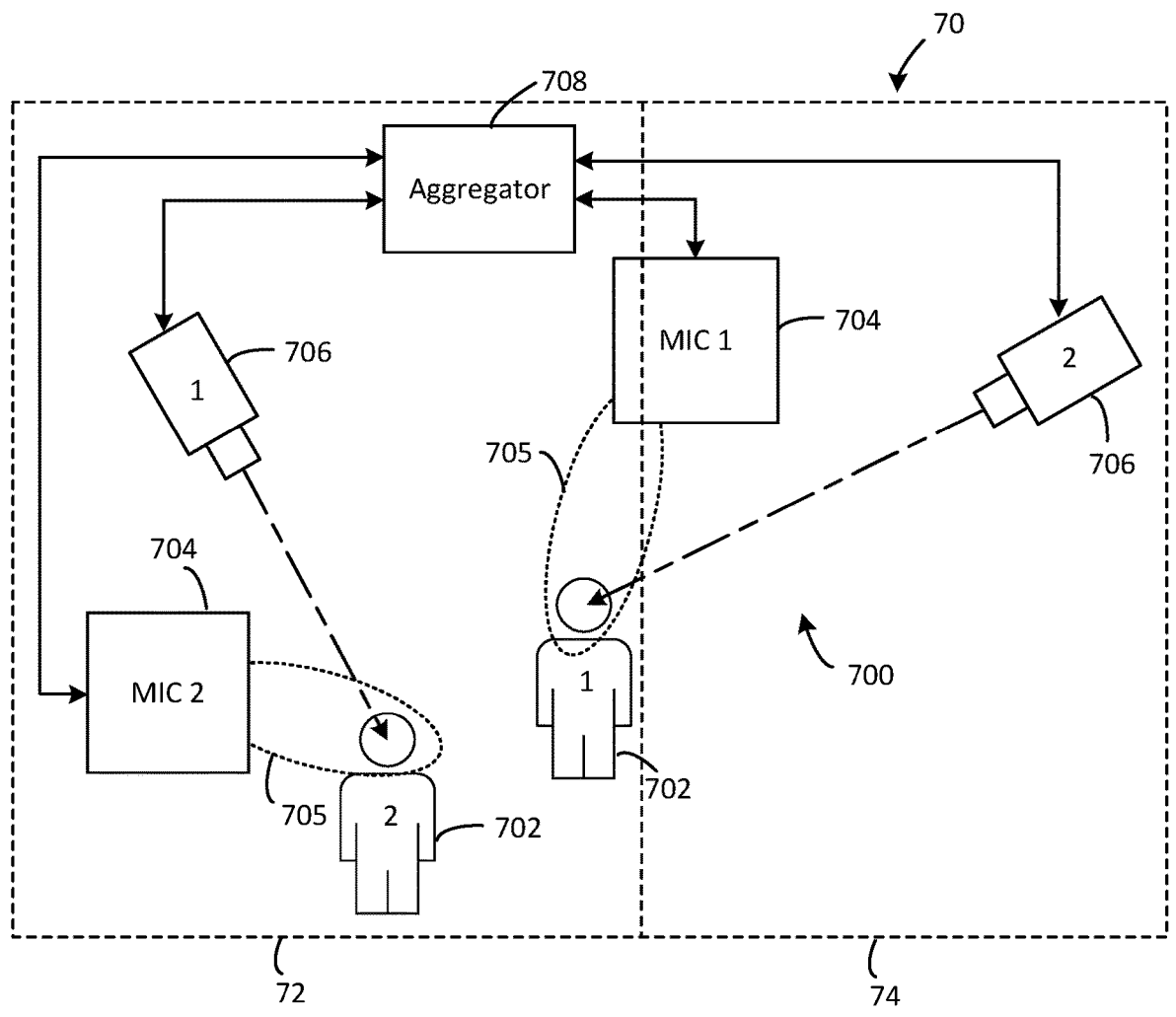

FIGS. 8 through 10 depict an exemplary environment 70 in which one or more of the systems and methods disclosed herein may be used. As shown, the environment 70 comprises a conferencing system 700 that can be utilized to improve camera positioning for one or more talkers 702 by using a lobe location selected based on talker coordinates obtained by one or more microphones 704 to determine which of a plurality of cameras 706 is best suited for capturing image and/or video of each talker 702, in accordance with embodiments. It should be understood that while FIGS. 8-10 illustrate one potential environment, the systems and methods disclosed herein may be utilized in any applicable environment, including but not limited to offices, huddle rooms, theaters, arenas, music venues, etc. The system 700 may include various components not shown in FIGS. 8-10, such as, for example, one or more loudspeakers, tabletop microphones, display screens, and/or computing devices. In embodiments, one or more of the components in the system 700 may include a digital signal processor, wireless receivers, wireless transceivers, etc. In addition, the environment 70 may include one or more other persons, besides the talker 702, and/or other objects (e.g., musical instruments, phones, tablets, computers, HVAC equipment, etc.) that are not shown. It should be understood that the components shown in FIGS. 8-10 are merely exemplary, and that any number, type, and placement of the various components in the environment 70 are contemplated and possible.

According to embodiments, the environment 70 may be substantially similar to the environment 10 of FIG. 1, and the conferencing system 700 may be substantially similar to the conferencing system 100 of FIG. 1 and/or may be implemented using the conferencing system 300 of FIG. 4. For example, as shown, the conferencing system 700 comprises a plurality of microphones 704, each of which may be substantially similar to the microphone array 200 of FIG. 3, the microphones 104 of FIG. 1, and/or the microphones 302a, . . . , z of FIG. 4. The conferencing system 700 also comprises a plurality of cameras 706, each of which may be substantially similar to the camera 106 of FIG. 1 and/or the cameras 306a, . . . , z of FIG. 4. In addition, the system 700 comprises an aggregator 708 that may be substantially similar to the aggregator unit 304 of FIG. 4 and/or the aggregator 108 of FIG. 1. Accordingly, the microphones 704, the cameras 706, and the aggregator 708 will not be described in great detail for the sake of brevity.

In some embodiments, the system 700 further includes a camera controller (e.g., camera controller 308 of FIG. 4) for receiving location information from the microphones 704 and/or the aggregator 708, and positioning the cameras 706 towards the received location. The camera controller may be a standalone device, integrated with the aggregator 708, or included in one of the cameras 706. The camera controller may point or position the camera towards a particular location (e.g., a talker location) by adjusting one or more of an angle, a tolt, a zoom, and a framing of the camera, or any other suitable setting.

The components of the conferencing system 700 may be in wired or wireless communication with each other and/or with a remote device (e.g., cloud computing server, etc.). In some embodiments, one or more components of the system 700 may be integrated together or into a single device. For example, the aggregator 708 may be included in one of the microphones 704 or one of the cameras 706.

Each microphone 704 can detect a sound, or audio activity, in the environment 70 and determine a location of the sound, or the audio source (e.g., talker 702) that produced the sound, relative to the microphone 704, or in a coordinate system of the microphone 704. For example, each microphone 704 may include an audio activity localizer (e.g., audio activity localizer 208 of FIG. 3) or other audio source localization algorithm for determining a set of coordinates (or "localization coordinates") that represents the location of the audio activity in the environment 70 (or "detected talker location"), based on audio signals received from microphone elements (e.g., microphone elements 202a,b, . . . , zz of FIG. 3) in the microphone 704.

Each microphone 704 (or microphone array) can also deploy a lobe towards the detected talker location for capturing audio produced by the active talker 702. For example, each microphone 704 may include a lobe selector (e.g., lobe selector 210 of FIG. 3) configured to determine which of a plurality of lobes of the microphone 704 is best suited for picking up or capturing audio at the localization coordinates determined by the audio activity localizer. The audio activity localizer may send the detected talker location, or corresponding audio localization coordinates, to the lobe selector for selecting an optimal lobe based thereon. The microphone 704 may also include a beamformer (e.g., beamformer 206 of FIG. 3) for deploying an audio pick-up beam (or lobe) towards the selected lobe location, which may be provided as a set of coordinates in a coordinate system of the microphone 704.

As shown, the environment 70 includes multiple microphones 704 located in different areas of the room or space. Each microphone 704 may be configured to deploy multiple lobes to various locations in the environment 70 using, for example, automatic lobe tracking technology, static lobe technology, and/or other suitable techniques. The use of multiple microphones 704 and lobes may improve the sensing and capture of sounds from audio sources in the environment 70, and provide more accurate estimates of an active talker location in the environment 70, as described herein. The environment 70 also includes multiple cameras 706 located in different areas of the room or space. The use of multiple cameras 706 may enable the capture of more and varied types of images and/or video of the environment 70. For example, a camera 706 located at the front of the environment 70 may be utilized to capture a wider view of the room, while a camera 706 located on a wall of the room may be utilized to capture close-ups of talkers 702 in the environment 70.

The presence of multiple microphones and multiple cameras in a given environment can also complicate camera selection and/or microphone or lobe selection for an active talker. For example, when multiple microphone arrays are present, there may be more than one possible audio beam or lobe location for covering an active talker, which may make it difficult to identify a unique talker and/or lobe location for camera positioning purposes. As another example, when multiple cameras are present, it may be difficult to determine which camera should be directed or pointed towards each talker due to overlapping coverage areas and/or conflicting camera angles.

In embodiments, the conferencing system 700 of FIGS. 8-10 may be configured to optimize selection of an appropriate microphone from the plurality of microphones 704 and/or selection of an appropriate camera from the plurality of cameras 706 for an active audio source (e.g., talker 702 in FIG. 8) in the environment 70 by, at least in part, coordinating the microphones 704 with the cameras 706. As shown in FIG. 8, the environment 70 may be divided into a number of regions 72 and 74, such that each region 72, 74 includes only one of the cameras 706. In various embodiments, the regions 72 and 74 may be assigned to respective cameras 706 depending on which camera 706 has the best view or coverage of the region, or is otherwise best suited for capturing a talker located in that region of the environment 70 based on, for example, an angle or orientation of the camera 706. The regions 72 and 74 may be pre-configured by a technician or installer of the system 700 based on various aspects of the environment 70, including, for example, the size and shape of the room or space, the number of cameras 706 present, the locations or placement of the cameras 706, and the presence and/or locations of other known objects (e.g., tables, chairs, a lectern or podium, a display screen and/or white board, microphones 704, speakers, etc.). Though FIGS. 8-10 show the environment 70 as including only two regions, it should be appreciated that any number of regions may be created in a given environment, for example, depending on the physical characteristics of the environment, the total number of cameras present, and/or other relevant considerations.

In some embodiments, the installer may manually determine the locations of the microphones 704 relative to the environment 70, the placement and orientation of each of the cameras 706 relative to the microphones 704, and/or the locations of other objects in the environment 70. In other embodiments, the installer may use a graphical tool or other software of the system 700 that is configured to automatically determine a location of each microphone 704, location and orientation information for each of the cameras 706, and/or location or placement information for other objects in the environment 70. For example, the graphical tool may be configured to scan the environment 70 for one or more objects using sound excitation, audio localization, and/or triangulation techniques, or the like, to identify the locations of the cameras 706, microphones 704, and/or speakers (not shown) with respect to a common coordinate system (e.g., a coordinate system of the environment 70 or one of the components of the system 700).

In embodiments, the known locations of the microphones 704 and the cameras 706, as well as the parameters of the regions 72 and 74, including camera assignments, may be provided to the aggregator 708 and stored in a memory that is communicatively coupled to the aggregator 708. In some cases, the aggregator 708 may receive the parameters of the regions 72 and 74 from a separate computing device that is internal or external to the system 700. In some cases, the aggregator 708 may also receive the known microphone and camera locations from the separate computing device, which may be used to operate the graphical tool for automatically determining the array and camera locations, for example. In other cases, the aggregator 708 may receive the microphone locations from each of the microphones 704 and the camera locations and orientations from each of the cameras 706.

During operation, the aggregator 708 can receive location information from the plurality of microphones 704, such as localization coordinates generated upon detecting audio activity associated with the talker 702. For example, the aggregator 708 may combine time-synchronized audio localization coordinates (or detected talker locations) received from two or more of the microphones 704 for the same audio activity to determine or estimate an active talker location in the environment 70 with greater accuracy than the individual coordinates. The localization coordinates may be combined by determining, for example, a common point or intersection of the vectors formed by the localization coordinates, or a nearest point between the detected talker locations, as described herein, or using any other suitable technique.

Prior to calculating the estimated talker location, the aggregator 708 may first convert the received coordinates (or detected talker locations) to a common coordinate system, so that the estimated talker location is provided in the common coordinate system. The common coordinate system may be a coordinate system that is centered on one of the microphones 704, one of the cameras 706, and/or the environment 70, or any other previously-determined coordinate system. In some cases, the aggregator 708 may convert the estimated talker location from the common coordinate system to a second coordinate system, such as the coordinate system of the camera 706 that will receive the converted information, so that the estimated talker location is readily usable by that camera 706. In other cases, the given camera 706 and/or camera controller may be configured to convert location information received from the aggregator 708 into the second coordinate system of the receiving camera 706.

The aggregator 708 can use the estimated talker location to identify or select a lobe of the plurality of microphones 704 that will optimally capture the active talker and/or the estimated talker location. For example, the aggregator 708 may select the lobe that has a lobe location corresponding to, or overlapping with, the estimated talker location. If multiple lobe locations correspond to the talker location, the aggregator 708 may determine a distance between the talker location and each of the microphones 704 in a common coordinate system (e.g., a coordinate system of one of the microphones 704 or of the environment 70) and may determine or identify the microphone 704 that is closest to the identified talker location and/or has an available lobe with a lobe location that is closest to the talker location in the common coordinate system. In some cases, the aggregator 708 may determine the direction in which the talker 702 is facing (e.g., using facial detection technology of the cameras 706) and may identify the microphone 704 that is closest to a face of the talker 702 and/or has an available lobe that can be directed towards the talker's face. The aggregator 708 may be configured to calculate the distance between the identified talker location and each of the microphones 704 using the sound localization and triangulation techniques described herein or any other known technique.

In other embodiments, the aggregator 708 may be configured to use networked automixer technology, or the like, to identify a unique talker location in the environment 70 and select an optimal lobe across the multiple microphones 704 for capturing the identified talker location. In such cases, the microphones 704 may be connected together to form a network and may receive, from the aggregator 708, a common gating control signal that indicates which of the microphone lobes across the network are gated on and/or which lobes are gated off. As an example, the network automixer may generate the common gating control signal by determining which lobe detected the strongest voice signal (or other audio signal) for a given audio event and by selecting that lobe, and the corresponding microphone 704, for the common gating control signal. Where the microphone 704 is a microphone array, the microphone 704 may be configured to generate a beamformed audio signal based on audio detected by the microphone elements in the microphone 704 and the common gating control signal. The aggregator 708 may then generate a final mixed audio signal for the detected audio event by aggregating the beamformed audio signals received from the microphones 704. Thus, the final mixed audio signal may reflect a desired audio mix wherein audio from certain channels of the microphones 704 is emphasized while audio from other channels is deemphasized or suppressed.

The common gating control signal may also be used by the aggregator 708 to determine an estimated location and/or orientation of the talker 702. For example, the aggregator 708 may use the common gating control signal, and/or other gating decision information, to determine which lobe(s) of the microphones 704 is/are available (e.g., gated on). Moreover, given that the common gating control signal is derived based on the strongest voice signal detected by the network automixer, the aggregator 708 may use the placement or location of the lobe that is gated on to determine the estimated talker orientation. For example, the aggregator 708 may use the networked automixer signals to determine a direction in which the talker 702 is facing and may use the gating decisions to identify the active lobe and/or microphone 704 that is directed towards the talker's face and the estimated talker location, or is otherwise better able to capture audio in the direction that the talker 702 is facing. As an example, the gating decisions from the networked automixer may be used to determine that the talker 702 is physically closer to a first microphone 704 but a second microphone 704 is better situated to pick up a voice of the talker 702 because the talker 702 is facing the second microphone 704.

In some cases, the network automixer may receive location information directly from one or more microphones. For example, in embodiments where the microphones 704 include one or more directional microphones or other non-array microphones (e.g., a lavalier microphone, a handheld microphone, a boundary microphone, etc.), the location of such microphone(s) and/or the placement and/or direction of an audio pick-up pattern or other type of microphone coverage used by such microphone(s) (collectively referred to herein as "location information") may be previously known or pre-determined. In such cases, the aggregator 708 may receive location information for the one or more directional microphones 704 from the network automixer, as previously stored data or sent in run-time, and the aggregator 708 may use the known location information to determine (or triangulate) the estimated location of the talker 702 and select the appropriate camera 706 based thereon. Accordingly, in some cases, the aggregator 708 may make camera selections based on, not only audio source localizations, but also readily available or known location information obtained from the plurality of microphones 704.

As shown in FIG. 8, once the aggregator 708 has selected a lobe 705 and/or microphone 704 for optimally capturing audio produced by the talker 702, the selected lobe 705 may be deployed towards the talker 702 by the corresponding microphone 704 (e.g., second microphone 704) using one or more of the techniques described herein. In addition, a location of the selected lobe 705 (or "lobe location") may be used by the aggregator 708 to determine or identify which of the plurality of cameras 706 is best-suited for capturing image and/or video of the talker 702 and/or the selected lobe location. In some cases, the gating decisions of the networked automixer may also drive which camera 706 to use. For example, since the networked automixer has a global perspective of the environment 100, the above-described gating decisions may be used to identify the camera 706 that is pointing towards the face of the talker 702, and thus avoid selecting a camera that is pointing towards a back of the talker's head.

In some cases, the aggregator 708 may select the appropriate camera 706 by identifying the region 72, 74 of the environment 70 that includes or corresponds to the selected lobe location, and by selecting the camera 706 that is assigned to, or configured to capture, the identified region 72, 74. For example, in FIG. 8, the aggregator 708 may select a first camera 706 for capturing the talker 702 because the selected lobe 705 is located within the first region 72, and the first camera 706 is assigned to the first region 72. The aggregator 708 may convert the selected lobe location from a first coordinate system of the corresponding microphone 704 (e.g., the second microphone 704 in FIG. 8) to a second coordinate system associated with the environment 70 in order to identify which of the regions 72 and 74 of the environment 70 contains the selected lobe location.

The aggregator 708 can send or transmit the coordinates of the selected lobe location to the selected camera 706 for positioning or pointing an image capture component of the camera 706 towards the talker 702, or more specifically, the selected lobe location. In some embodiments, once the appropriate camera 706 is selected, the aggregator 708 may convert the lobe location from the second coordinate system of the environment 70 to a third coordinate system associated with the selected camera 706, so that the lobe location (or set of coordinates) is readily usable by the camera 706 upon receipt. In other embodiments, the aggregator 708 may transmit the lobe location in the first or second coordinate system to the selected camera 706, and the camera 706 and/or camera controller may be configured to convert the received lobe location to the third coordinate system.

While FIG. 8 shows only one talker 702, it should be appreciated that similar techniques may be applied in cases with multiple talkers 702 in the environment 70. In particular, the aggregator 708 may determine the best lobe location for each of the talkers 702 one by one, using one of more of the techniques described herein. For example, as shown in FIG. 9, the aggregator 708 may determine that a first lobe 705 of a first microphone 704 is optimal for capturing sounds generated by a first talker 702, while a second lobe 705 of a second microphone 704 is optimal for capturing sounds generated by a second talker 702.

FIG. 9 also shows that the two talkers 702 are located at different locations in the same region 72 of the environment 70 and thus, cannot be captured by the same camera 706. In such cases, the aggregator 708 may further analyze the relative locations of the cameras 706, the microphones 704, and each of the regions 72 and 74 to identify the camera 706 that is best situated, or has the best angle, for capturing each of the talkers 702. For example, in FIG. 9, the aggregator 708 may determine that the first camera 706 is closest to, and has the clearest view of, the second talker 702, thus leaving the second camera 706 to capture the first talker 702, even though both talkers 702 are located in the region 72 that is assigned to the first camera 706.

In various embodiments, the microphones 704 and/or the cameras 706 may track one or more active talkers 702, in real-time, as they move about the environment 70 while talking or otherwise producing sounds. For example, each of the cameras 706 may be configured to scan its assigned region 72, 74 for imagery that resembles a human face and may stay on an identified face as the corresponding talker 702 moves about (e.g., sitting, standing, gesturing, changing position, etc.). As another example, the microphones 704 may be configured to continuously or periodically determine talker locations for newly detected sounds and provide the newly identified talker locations to the aggregator 708. The aggregator 708 may combine the new talker locations from each of the microphones 704 that correspond to the same audio activity and based thereon, determine a more precise estimate of the talker's current location.

In some cases, a talker 702 may move about the environment 70 so dramatically, or to such a new location, that the camera 706 and/or microphone 704 directed towards the talker 702 may no longer be able to capture the talker 702 and/or may not be best suited for doing so. For example, FIG. 10 shows an exemplary scenario in which the second talker 702 has moved from a first location in the first region 72 (e.g., as shown in FIG. 9) to a second location in the second region 74 where the first camera 706 does not have a clear line of sight to the second talker 702 anymore (e.g., because the first talker 702 is in the way).

In such cases, the aggregator 708 may change the camera and/or microphone assignments in the environment 70 based on, or to accommodate, the new talker location. For example, the aggregator 708 may identify or estimate a new location of the second talker 702 based on new audio signals detected by one or more microphones 704 and using audio localization and/or triangulation techniques, as described herein. The aggregator 708 may determine that the new talker location is now closer to the first microphone 704 than the second microphone 704 and that audio produced at the new talker location would be better captured by a second lobe 705 of the first microphone 704. Accordingly, the first microphone 704 may be directed, e.g., by the aggregator 708, to deploy and/or steer the second lobe 705 towards the new talker location of the second talker 702. Moreover, the lobe of the second microphone 704 that was originally directed towards the second talker 702 (e.g., as shown in FIG. 9) may be gated off or deactivated.

Similarly, the aggregator 708 may determine that the new talker location is closer to the second camera 706 than the first camera 706 and thus, may direct the second camera 706 to point an image capturing component of the second camera 706 away from the first talker 702 (e.g., as shown in FIG. 8) and towards the new talker location, as shown in FIG. 10. The aggregator 708 may also determine that the first camera 706 is now optimal for capturing the first talker 702 and thus, may move or steer the first camera 706 towards the first talker 702, or an estimated talker location that corresponds to the first talker 702, as shown in FIG. 10.

In some embodiments, the conferencing system 700 shown in FIGS. 8-10 can be configured to enable the talkers 702 to use one or more personal cameras (not shown) to capture their image, instead of the cameras 706 situated in the environment 70. For example, one or more of the talkers 702 may choose to join a conference call, or other event, using a camera installed on a laptop, tablet, or other personal device that can be carried into the environment 70 by the talker 702. In such cases, the talker(s) 702 may connect their personal device(s) to the aggregator 708, or other controller in the environment 70, and use their device(s) to contribute individual videos to the call. In some cases, the personal cameras can be used in conjunction with the one or more of the cameras 706. For example, the first camera 706 may be used to capture the first talker 702 located in the first region 72 of the environment 70, while personal cameras may be used to individually capture the second talker 702 and other talkers (not shown) located in the second region 74 of the environment 70. In any case, the aggregator 708 can be configured to stitch the received videos together or otherwise combine the captured imagery into a single video output. For example, each talker's individual video may be presented in a separate tile, as a separate stripe (e.g., vertical or horizontal), or in any other section of the combined video.

In the embodiments that use personal cameras, one or more of the microphones 704 may still be used to provide sound localization information for estimating talker locations, using the techniques described herein, as well as capture audio signals generated in the environment 70 (e.g., for transmitting to remote participants of the conference call or other event). The estimated talker locations may be used for purposes other than steering the appropriate (e.g., nearest) camera 706 towards the corresponding talker 702. For example, when a given talker 702 is using their own camera, the aggregator 708 can be configured to determine an estimated location of that talker 702, e.g., based on sound localizations provided by one or more of the microphones 704, and assign the estimated talker location to the given talker's personal camera, or device. In this manner, the output of each personal camera can be associated with a specific location in the environment 70. In addition, the aggregator 708 can be configured to use the estimated talker locations to pair each captured audio signal with the appropriate personal camera, i.e. the camera that is directed towards the talker 702 producing that audio (or the talker 702 located at or near the estimated talker location). This prevents the aggregator 708 from enabling one of the cameras 706 installed in the environment 70 based on audio detected at the location of the personal camera user.

In various cases, the aggregator 708 can be configured to identify a talker 702 (or their device) located in the environment 70 based on an identifier or other identifying information that is associated with the talker 702 (or their device). For example, the aggregator 708 may receive the identifier from the talker's personal device, or camera, as the talker 702 enters the environment 70, or may be previously provided as part of the ongoing conference call or other event. The identifier may be a device identifier, or other information uniquely associated with the talker's personal camera (or device), a user identifier, or other information uniquely associated with the given talker, or any other type of identifier. In some cases, the aggregator 708 can be further configured to use the identifier to assign an estimated talker location as corresponding to a particular talker, personal camera, and/or personal device. For example, the aggregator 708 may assign an appropriate identifier (i.e. the identifier that corresponds to the particular talker) to the estimated talker location.

FIG. 11 illustrates an exemplary method or process 800 for determining camera positioning in an environment based on a lobe location that is selected according to talker coordinates obtained by one or more microphones (or microphone arrays), in accordance with embodiments. The camera (e.g., camera 706 of FIG. 8) and the one or more microphones (e.g., microphones 704 of FIG. 8) may form part of a conferencing system (e.g., system 700 of FIG. 8) located in an environment (e.g., environment 70 of FIG. 8). The environment may be a conferencing room, event space, or other area that includes one or more talkers (e.g., talker 702 of FIG. 8) or other audio sources. The camera may be configured to detect and capture image and/or video of the talker(s). The microphones may be configured to detect and capture sounds produced by the talker(s) and determine the locations of the detected sounds. The method 800 may be performed by one or more processors of the conferencing system, such as a processor of a computing device included in the system and communicatively coupled to the camera and the microphones. In some cases, the method 800 may be performed by an aggregator (e.g., aggregator unit 304 of FIG. 4) and/or a camera controller (e.g., camera controller 308 of FIG. 4) included in the conferencing system.

As shown in FIG. 11, the method 800 may include, at step 802, determining, using a plurality of microphones (or microphone arrays) and at least one processor, and based on audio associated with a talker, a talker location in a first coordinate system that is relative to a first microphone of the plurality of microphones. For example, the first coordinate system may be a coordinate system where the first microphone is at the origin, or any other suitable coordinate system. In embodiments, determining the talker location may include detecting, using the first microphone, a sound generated near the first microphone, such as the audio associated with the talker, and determining a location of the detected sound using an audio localization algorithm executed by an audio activity localizer (e.g., audio activity localizer 208 of FIG. 3) of the first microphone.

Step 804 includes selecting, using at least one processor and based on the talker location in the first coordinate system, a lobe location of a select one of the plurality of microphones in the first coordinate system. In some embodiments, selecting the lobe location may include: determining a distance between the talker location and each of the plurality of microphones in the first coordinate system; and identifying the select one of the plurality of microphones as being closest to the talker location in the first coordinate system.

Step 806 includes selecting, using the at least one processor and based on the lobe location, a first camera of a plurality of cameras. In some embodiments, selecting the first camera may include: converting, using the at least one processor, the lobe location from the first coordinate system to a common coordinate system; identifying a first region of a plurality of regions in the common coordinate system as including the lobe location in the common coordinate system, each region being assigned to one or more of the plurality of cameras; and identifying the first camera as being assigned to the first region. As an example, the common coordinate system may be a coordinate system of the environment (e.g., environment 70 of FIG. 8) or any other mutually-agreed upon coordinate system.

Step 808 includes converting, using the at least one processor, the lobe location to a second coordinate system that is relative to the first camera, so that the lobe location is readily usable by the first camera. For example, the second coordinate system may be a coordinate system where the first camera is at the origin, or any other suitable coordinate system. In some cases, the lobe location may be converted from the first coordinate system of the first microphone array to the second coordinate system of the first camera. In other cases, the lobe location may be converted from the third coordinate system of the environment to the second coordinate system of the first camera.

Step 810 includes transmitting, from the at least one processor to the first camera, the lobe location in the second coordinate system to cause the first camera to point an image capturing component of the first camera towards the lobe location in the second coordinate system. The first camera may point the image capturing component towards the lobe location in the second coordinate system by adjusting one or more of an angle, a tilt, a zoom, and a framing of the camera, or any other relevant parameter of the camera.

As described herein, in some embodiments, the positions of camera(s) and/or microphone(s) included in the conferencing systems described herein, relative to each other and/or a given environment, are previously known, for example, by another component of the system or by an external device in communication with the system. In other embodiments, however, the relative positions of the camera(s) and/or microphone(s) are not initially known. In such cases, the conferencing system may use an audio localization algorithm, triangulation techniques, and/or other tools to automatically determine the locations of the camera(s), microphone(s) and/or other audio devices relative to each other in the environment.

In some cases, location and/or orientation information for a given microphone (e.g., microphone 302*a* of FIG. 4) may be further improved or refined based on location and/or orientation information obtained by a camera (e.g., camera 306*a* of FIG. 4) in the same environment, which, in turn, may improve the coordinate information that is provided to the camera for positioning towards an active talker, for example.

More specifically, an aggregator (e.g., aggregator unit 304 of FIG. 4) and/or camera controller (e.g., camera controller 308 of FIG. 4) of the conferencing system (e.g., conferencing system 300 of FIG. 4) may be configured to point the camera towards the microphone, using a previously-determined location of the array in a first coordinate system that is relative to the camera, and identify that first location as a center or "0" point of a second coordinate system that is relative to the microphone. Next, the aggregator and/or camera controller may point the camera towards a second location in the first coordinate system that is known as, or intended to be, the center (0, 0, 0) of the second coordinate system of the microphone.

Based on the first and the second locations in the first coordinate system, a discrepancy between the actual center of the second coordinate system of the microphone and the intended center of the microphone's coordinate system may be calculated. That discrepancy may be sent to the microphone for correcting a deviation in the center of the second coordinate system. The discrepancy may also be used to improve the transposition or conversion of coordinates from the second coordinate system to the first coordinate system, and vice versa. In addition, the discrepancy identified by the camera may be used to correct or refine information that indicates an orientation of the camera with respect the microphone. In some embodiments, the aggregator and/or the camera controller, or other component of the conferencing system, may be configured to automatically calculate the discrepancy between the intended and true centers of the second coordinate system. In other embodiments, the installer or other user may manually calculate the difference between the two locations and correct the central coordinate of the second coordinate system accordingly, or otherwise enter this value into the microphone array, using an appropriate user interface, for example.

Figure 12:
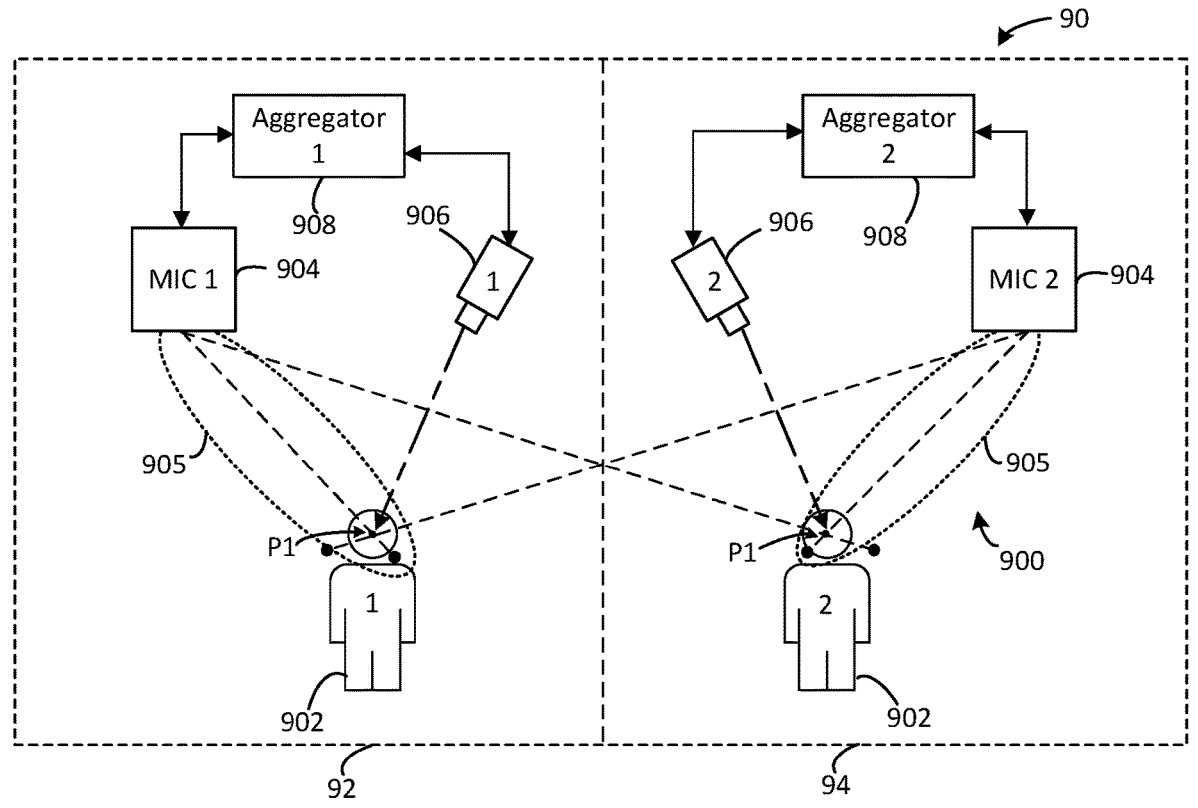
FIG. 12 is a schematic diagram of an exemplary environment comprising a conferencing system that can be utilized to determine camera positioning for a talker in one region of the environment using a lobe location selected based on talker coordinates obtained by microphones in the same region and in another adjacent region, in accordance with one or more embodiments.

FIG. 12 illustrates another exemplary environment 90 in which one or more of the systems and methods disclosed herein may be used. As shown, the environment 90 comprises a conferencing system 900 that can be utilized to improve camera positioning for talkers 902 located in different but nearby regions 92 and 94 of the environment 90 based on talker coordinates obtained by microphones 904 located in the different regions 92 and 94 of the environment 90. In embodiments, the conferencing system 900 comprises the first and second microphones 904, first and second cameras 906, and first and second aggregators 908. The components of the conferencing system 900 may be substantially similar to the components of the conferencing system 700 shown in FIGS. 8-10. For example, the microphones 904 may be similar to the microphones 704, the cameras 906 may be similar to the cameras 706, and the aggregators 908 may be similar to the aggregator 708. Accordingly, the individual components of the conferencing system 900 will not be described in great detail for the sake of brevity.

In the illustrated embodiment, the environment 90 comprises a first region 92 and a second region 94 adjacent the first region 92. The regions 92 and 94 may be side by side areas, as shown, or have a gap or space between them (not shown). In some cases, the regions 92 and 94 may be physically separated workspaces or areas (e.g., using one or more dividers, walls, etc.). In other cases, the regions 92 and 94 may be "virtual" workspaces or other areas of a shared space that have designated boundaries known to the aggregators 908, and talkers 902, but may not have physical walls or other structures between the areas. As shown, the first region 92 includes or encompasses a first talker 902, a first microphone 904, a first camera 906, and a first aggregator 908. Similarly, the second region 94 includes or encompasses a second talker 902, a second microphone 904, a second camera 906, and a second aggregator 908. According to embodiments, the regions 92 and 94 can be configured to allow the talkers 902 to work or otherwise operate individually within their respective regions 92 and 94, despite being part of a shared space. For example, the virtual workspaces may enable the talkers 902 to individually participate in different video conferencing calls, or other audio-visual event, at the same time, without disturbing each other.

In embodiments, in order to improve camera positioning, or talker tracking, for the cameras 906, the aggregators 908 can be configured to calculate an estimated talker location for a given talker 902 using talker coordinates obtained by various microphones 904 in the environment 90, including one or more microphones 904 located in a different region 92, 94 than the given talker 902. For example, the first microphone 904 may send, to the first aggregator 908, a first set of talker coordinates (e.g., x1, y1, z1) for a first estimated location p1 of the first talker 902, using localization techniques described herein. For the same event, the second microphone 904 may also send, to the same first aggregator 908, a second set of talker coordinates (e.g., x2, y2, z2) for a second estimated location p2 of the same first talker 902, using the localization techniques. Using one or more techniques described herein, the first aggregator 908 may combine the two sets of coordinates to determine a more accurate estimated talker location for the first talker 902. Thus, the conferencing system 900 can be configured to obtain (or triangulate) an estimated talker location with higher accuracy by using microphone(s) 904 located outside a given region 92, 94 of the environment 90 to increase the number of time-synchronized localizations that are available for estimating the talker location.

Thus, the techniques described herein can help reduce manual measurements that are typically performed by an installer or integrator during configuration of the conferencing system, such as measurements of the distance and location between the camera and the microphone. The amount of time and effort by installers, integrators, and users can thus be reduced, leading to increased satisfaction with the installation and usage of the conferencing system.

The components of the microphone array 200 and/or any of the conferencing systems 100, 300, 500, 700, and 900 may be implemented in hardware (e.g., discrete logic circuits, application specific integrated circuits (ASIC), programmable gate arrays (PGA), field programmable gate arrays (FPGA), digital signal processors (DSP), microprocessor, etc.), using software executable by one or more computers, such as a computing device having a processor and memory (e.g., a personal computer (PC), a laptop, a tablet, a mobile device, a smart device, thin client, etc.), or through a combination of both hardware and software. For example, some or all components of the microphone array 200 and/or any of the systems 100, 300, 500, 700, and 900 may be implemented using discrete circuitry devices and/or using one or more processors (e.g., audio processor and/or digital signal processor) executing program code stored in a memory (not shown), the program code being configured to carry out one or more processes or operations described herein, such as, for example, the methods shown in FIGS. 5, 7, and 11. Thus, in embodiments, the microphone array 200 and/or any of the systems 100, 300, 500, 700, and 900 may include one or more processors, memory devices, computing devices, and/or other hardware components not shown in the figures.

All or portions of the processes described herein, including method 400 of FIG. 5, method 600 of FIG. 7, and method 800 of FIG. 11, may be performed by one or more processing devices or processors (e.g., analog to digital converters, encryption chips, etc.) that are within or external to the corresponding conferencing system (e.g., system 300 of FIG. 4). In addition, one or more other types of components (e.g., memory, input and/or output devices, transmitters, receivers, buffers, drivers, discrete components, logic circuits, etc.) may also be used in conjunction with the processors and/or other processing components to perform any, some, or all of the steps of the methods 400, 600, and/or 800. As an example, in some embodiments, each of the methods described herein may be carried out by a processor executing software stored in a memory. The software may include, for example, program code or computer program modules comprising software instructions executable by the processor. In some embodiments, the program code may be a computer program stored on a non-transitory computer readable medium that is executable by a processor of the relevant device.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be understood that examples disclosed herein may refer to computing devices and/or systems having components that may or may not be physically located in proximity to each other. Certain embodiments may take the form of cloud based systems or devices, and the term "computing device" should be understood to include distributed systems and devices (such as those based on the cloud), as well as software, firmware, and other components configured to carry out one or more of the functions described herein. Further, as noted above, one or more features of the computing device may be physically remote (e.g., a standalone microphone) and may be communicatively coupled to the computing device.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

In this disclosure, the use of the disjunctive is intended to include the conjunctive. The use of definite or indefinite articles is not intended to indicate cardinality. In particular, a reference to "the" object or "a" and "an" object is intended to also denote one of a possible plurality of such objects.

This disclosure describes, illustrates and exemplifies one or more particular embodiments of the invention in accordance with its principles. The disclosure is intended to explain how to fashion and use various embodiments in accordance with the technology rather than to limit the true, intended, and fair scope and spirit thereof. That is, the foregoing description is not intended to be exhaustive or to be limited to the precise forms disclosed herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The embodiment(s) provided herein were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

What is claimed is:

1. A method performed by one or more processors in communication with each of a first microphone array, a second microphone array, and a camera, the method comprising:

determining, using the first microphone array and based on audio associated with a talker, a first talker location in a first coordinate system that is relative to the first microphone array;

determining, using the second microphone array and based on the audio associated with the talker, a second talker location in a second coordinate system that is relative to the second microphone array;

converting the first talker location to either the second coordinate system or a third coordinate system that is relative to the camera;

determining, based on the converted first talker location and the second talker location, an estimated talker location in the third coordinate system; and transmitting, to the camera, the estimated talker location in the third coordinate system to cause the camera to point an image capturing component of the camera towards the estimated talker location.

2. The method of claim 1, wherein converting the first talker location comprises: converting the first talker location from the first coordinate system to the second coordinate system, and determining an estimated talker location in the third coordinate system comprises:

determining, based on the first and second talker locations in the second coordinate system, an estimated talker location in the second coordinate system; and converting the estimated talker location from the second coordinate system to the third coordinate system.

3. The method of claim 1, wherein converting the first talker location comprises: converting the first talker location from the first coordinate system to the third coordinate system, and determining an estimated talker location in the third coordinate system comprises:

converting the second talker location from the second coordinate system to the third coordinate system; and determining, based on the first and second talker locations in the third coordinate system, the estimated talker location in the third coordinate system.

4. The method of claim 1, wherein determining the estimated talker location comprises:

identifying a common point based on the first talker location and the second talker location.

5. The method of claim 1, wherein determining the estimated talker location comprises:

identifying a nearest point based on the first talker location and the second talker location.

6. The method of claim 1, wherein determining the first talker location comprises:

determining a location of a sound generated near the first microphone array using an audio localization algorithm executed by an audio activity localizer.

7. A system comprising:

a first microphone array configured to determine, based on audio associated with a talker, a first talker location in a first coordinate system that is relative to the first microphone array;

a second microphone array configured to determine, based on the audio associated with the talker, a second talker location in a second coordinate system that is relative to the second microphone array;

a camera comprising an image capturing component; and one or more processors communicatively coupled to each of the first microphone array, the second microphone array, and the camera, the one or more processors configured to:

convert the first talker location to either the second coordinate system or a third coordinate system that is relative to the camera;

determine, based on the converted first talker location and the second talker location, an estimated talker location in the third coordinate system; and transmit, to the camera, the estimated talker location in the third coordinate system, wherein the camera is configured to point the image capturing component towards the estimated talker location received from the one or more processors.

8. The system of claim 7, wherein convert the first talker location comprises: convert the first talker location from the first coordinate system to the second coordinate system, and determine an estimated talker location in the third coordinate system comprises:

determine, based on the first and second talker locations in the second coordinate system, an estimated talker location in the second coordinate system; and convert the estimated talker location from the second coordinate system to the third coordinate system.

9. The system of claim 7, wherein convert the first talker location comprises: convert the first talker location from the first coordinate system to the third coordinate system, and determine an estimated talker location in the third coordinate system comprises:

convert the second talker location from the second coordinate system to the third coordinate system; and determine, based on the first and second talker locations in the third coordinate system, the estimated talker location in the third coordinate system.

10. The system of claim 7, wherein determine the estimated talker location comprises; identify a common point based on the first talker location and the second talker location.

11. The system of claim 7, wherein determine the estimated talker location comprises; identify a nearest point based on the first talker location and the second talker location.

12. The system of claim 7, further comprising an audio activity localizer, wherein determine the first talker location comprises: determine a location of a sound generated near the first microphone array using an audio localization algorithm executed by the audio activity localizer.

13. The system of claim 7, wherein the camera is configured to point the image capturing component towards the estimated talker location by adjusting one or more of an angle, a tilt, a zoom, and a framing of the camera.

14. A non-transitory computer-readable storage medium comprising instructions that, when executed by one or more processors in communication with each of a first microphone array, a second microphone array, and a camera, cause the one or more processors to perform:

determining, using the first microphone array and based on audio associated with a talker, a first talker location in a first coordinate system that is relative to the first microphone array;

determining, using the second microphone array and based on the audio associated with the talker, a second talker location in a second coordinate system that is relative to the second microphone array;

converting the first talker location to either the second coordinate system or a third coordinate system that is relative to a camera;

determining, based on the converted first talker location and the second talker location, an estimated talker location in the third coordinate system; and transmitting, to the camera, the estimated talker location in the third coordinate system to cause the camera to point an image capturing component of the camera towards the estimated talker location.

15. The non-transitory computer-readable storage medium of claim 14, wherein converting the first talker location comprises: converting the first talker location from the first coordinate system to the second coordinate system, and determining an estimated talker location in the third coordinate system comprises:

determining, based on the first and second talker locations in the second coordinate system, an estimated talker location in the second coordinate system; and converting the estimated talker location from the second coordinate system to the third coordinate system.

16. The non-transitory computer-readable storage medium of claim 14, wherein converting the first talker location comprises: converting the first talker location from the first coordinate system to the third coordinate system, and determining an estimated talker location in the third coordinate system comprises:

converting the second talker location from the second coordinate system to the third coordinate system; and determining, based on the first and second talker locations in the third coordinate system, the estimated talker location in the third coordinate system.

17. The non-transitory computer-readable storage medium of claim 14, wherein determining the estimated talker location comprises identifying a common point based on the first talker location and the second talker location.

18. The non-transitory computer-readable storage medium of claim 14, wherein determining the estimated talker location comprises identifying a nearest point based on the first talker location and the second talker location.

19. The non-transitory computer-readable storage medium of claim 14, wherein determining the first talker location comprises determining a location of a sound generated near the first microphone array using an audio localization algorithm executed by an audio activity localizer.

20. The non-transitory computer-readable storage medium of claim 14, wherein the camera points the image capturing component towards the estimated talker location by adjusting one or more of an angle, a tilt, a zoom, and a framing of the camera.

\* \* \* \* \*